US011479360B2

(12) United States Patent
Costanzo et al.

(10) Patent No.: US 11,479,360 B2
(45) Date of Patent: Oct. 25, 2022

(54) MATERIAL HANDLING SOLUTIONS FOR DRONES

(71) Applicant: Laitram, L.L.C., Harahan, LA (US)

(72) Inventors: Mark Costanzo, New Orleans, LA (US); David Herbert Myers, River Ridge, LA (US); Eric M. Pressler, Mandeville, LA (US); Sean Edward Stephens, Metairie, LA (US); Matthew L. Fourney, Laurel, MD (US); Timothy J. Hicks, Ponchatoula, LA (US); Zachary R. Schexnaydre, Destrehan, LA (US); Jiaming Zha, Houston, TX (US); Preston Hill, LaPorte, TX (US)

(73) Assignee: Laitram, L.L.C., Harahan, LA (US)

( * ) Notice: Subject to any disclaimer, the term of this patent is extended or adjusted under 35 U.S.C. 154(b) by 69 days.

(21) Appl. No.: 17/077,023

(22) Filed: Oct. 22, 2020

(65) Prior Publication Data
US 2021/0039785 A1     Feb. 11, 2021

Related U.S. Application Data

(63) Continuation of application No. 15/750,284, filed as application No. PCT/US2016/046701 on Aug. 12, 2016, now Pat. No. 10,836,488.
(Continued)

(51) Int. Cl.
*B64D 1/22* (2006.01)
*B60L 53/36* (2019.01)
(Continued)

(52) U.S. Cl.
CPC ............. *B64D 1/22* (2013.01); *B60L 53/36* (2019.02); *B64C 39/024* (2013.01); *B65G 13/11* (2013.01);
(Continued)

(58) Field of Classification Search
CPC ...... B64D 1/02; B64D 1/22; B64D 2009/006; B64C 1/20; B64C 1/22; B64C 2201/128
See application file for complete search history.

(56) References Cited

U.S. PATENT DOCUMENTS 8,825,226 B1    9/2014  Worley, III
9,731,839 B1    8/2017  Beckman et al.
(Continued)

FOREIGN PATENT DOCUMENTS

CN      102960104 A      3/2013
DE  102014007995 A1     12/2015
(Continued)

OTHER PUBLICATIONS

European Search Report, European Patent Application No. 16835962, dated Mar. 25, 2019, European Patent Office, Munich, Germany.
(Continued)

*Primary Examiner* — Timothy D Collins
*Assistant Examiner* — Terri L Filosi
(74) *Attorney, Agent, or Firm* — Catherine M. Bishop

(57) ABSTRACT

A drone comprises at least one propeller for generating lift and an article containment area for containing an article to be carried by the drone. The floor of the article containment area comprises a dynamic support surface for supporting the article and allowing the article to move into, out of and through the article containment area. The dynamic support surface may be a conveyor belt forming the floor of the article containment area.

10 Claims, 37 Drawing Sheets

Related U.S. Application Data

(60) Provisional application No. 62/204,210, filed on Aug. 12, 2015.

(51) Int. Cl.
  *B65G 15/42* (2006.01)
  *B65G 17/24* (2006.01)
  *B65G 13/11* (2006.01)
  *B64C 39/02* (2006.01)
  *B65G 47/52* (2006.01)

(52) U.S. Cl.
  CPC ............. *B65G 15/42* (2013.01); *B65G 17/24* (2013.01); *B64C 2201/024* (2013.01); *B64C 2201/027* (2013.01); *B64C 2201/042* (2013.01); *B64C 2201/128* (2013.01); *B65G 47/52* (2013.01)

(56) References Cited

U.S. PATENT DOCUMENTS

| | | |
|---|---|---|
| 2005/0258019 A1 | 11/2005 | Tiberi |
| 2006/0207862 A1* | 9/2006 | Costanzo ............... B65G 17/32 198/698 |
| 2008/0175697 A1 | 7/2008 | Foster et al. |
| 2010/0012769 A1 | 1/2010 | Alber et al. |
| 2010/0065403 A1* | 3/2010 | Fourney ................. B65G 17/24 198/779 |
| 2011/0084162 A1 | 4/2011 | Goossen et al. |
| 2014/0032034 A1 | 1/2014 | Raptopoulos et al. |
| 2014/0090961 A1* | 4/2014 | Costanzo ............... B65G 47/53 198/779 |
| 2014/0217230 A1 | 8/2014 | Helou, Jr. |
| 2015/0120094 A1 | 4/2015 | Kimchi et al. |
| 2016/0096694 A1* | 4/2016 | Baylor .................... B65B 5/105 414/774 |
| 2017/0039510 A1 | 2/2017 | Ogilvie et al. |
| 2017/0217323 A1 | 8/2017 | Antonini et al. |
| 2018/0196418 A1 | 7/2018 | Meier et al. |

FOREIGN PATENT DOCUMENTS

| | | |
|---|---|---|
| EP | 3192357 A1 | 7/2017 |
| WO | 2015061008 A1 | 4/2015 |
| WO | 2015103411 A1 | 7/2015 |

OTHER PUBLICATIONS

Notice of Reasons for Refusal, Japanese Patent Application No. 2018-505436, dated May 19, 2020, Japanese Patent Office.

* cited by examiner

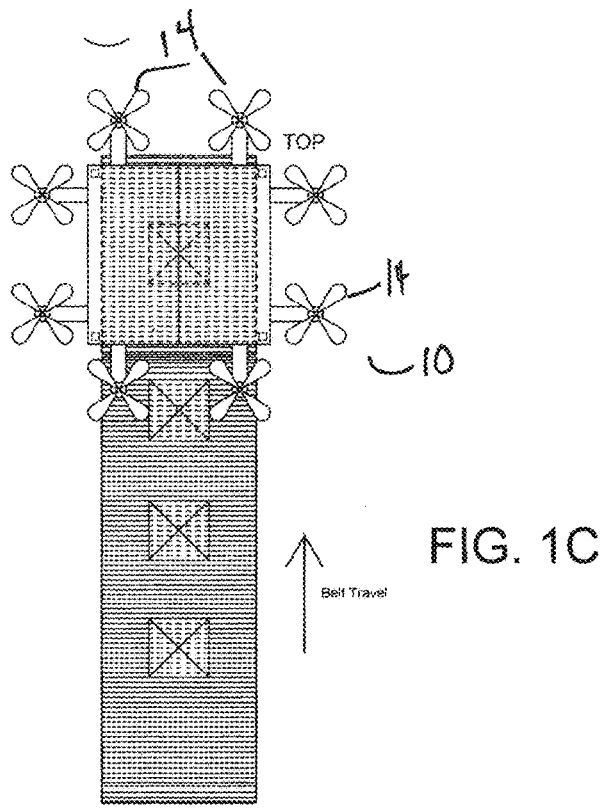
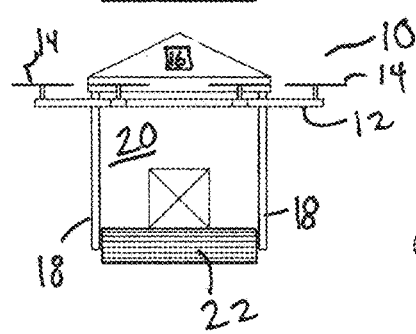
FIG. 1B
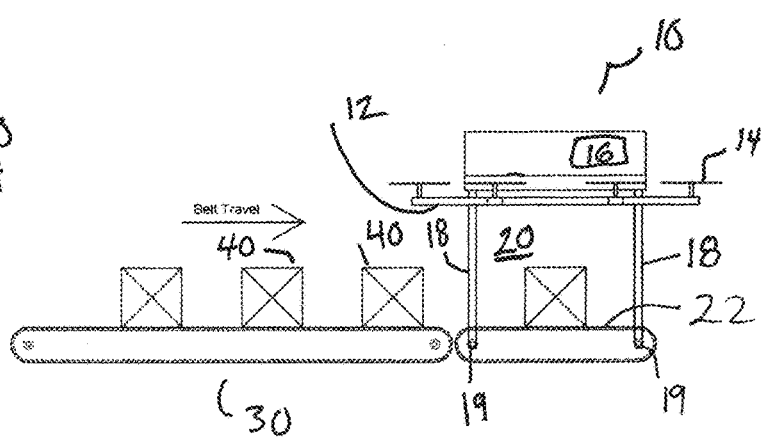
FIG. 1A

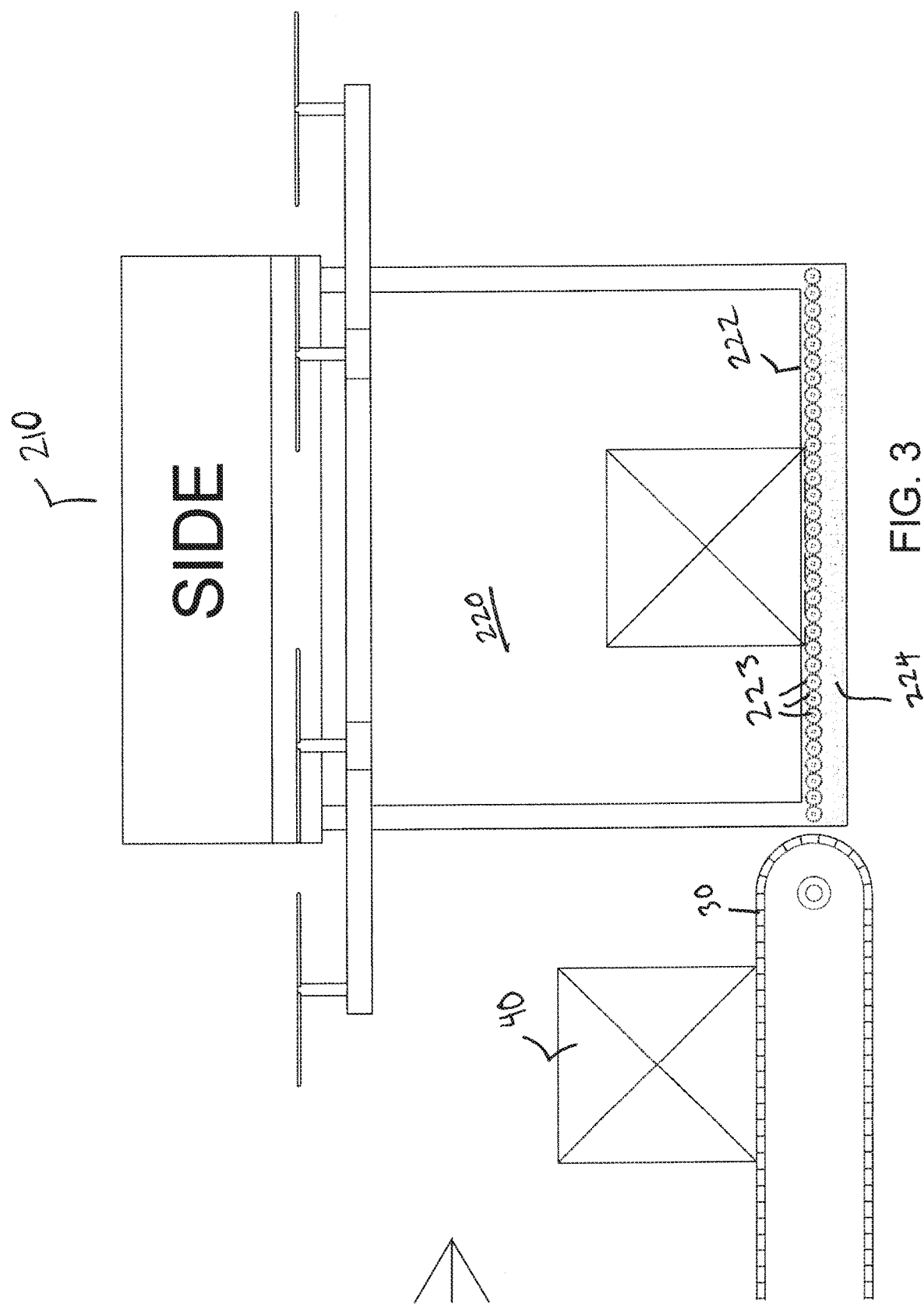

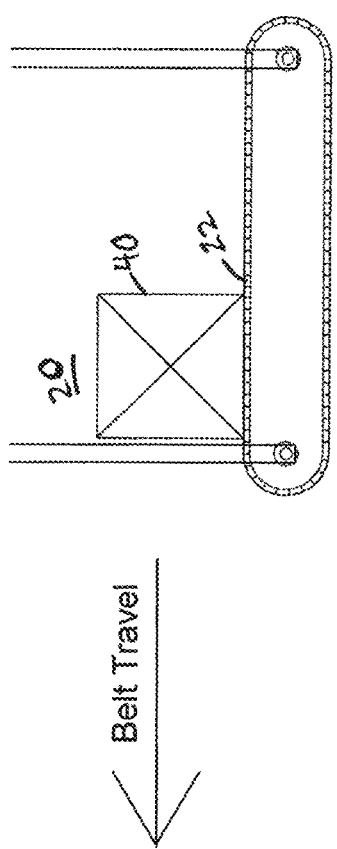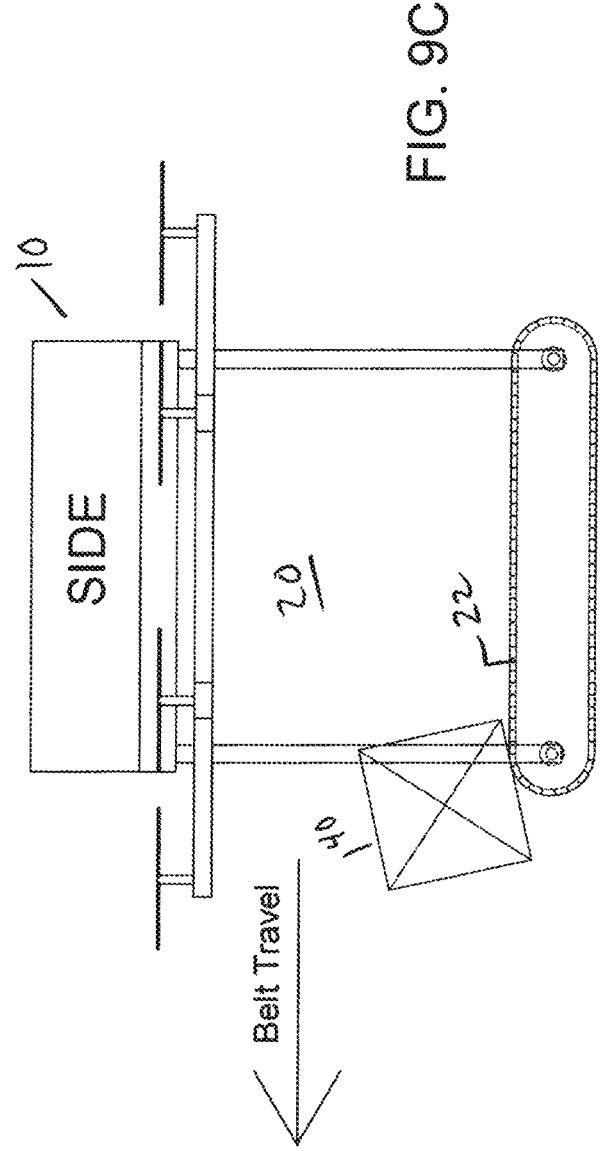

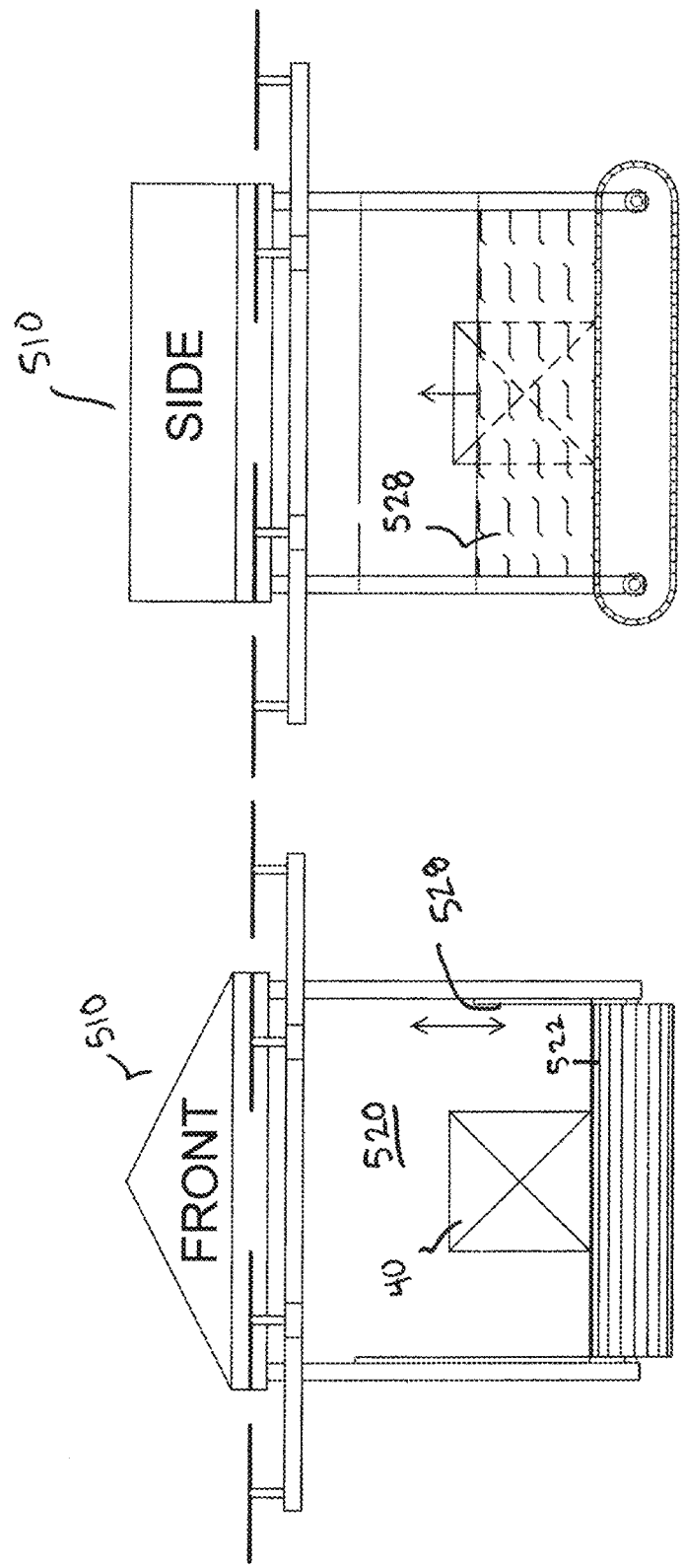

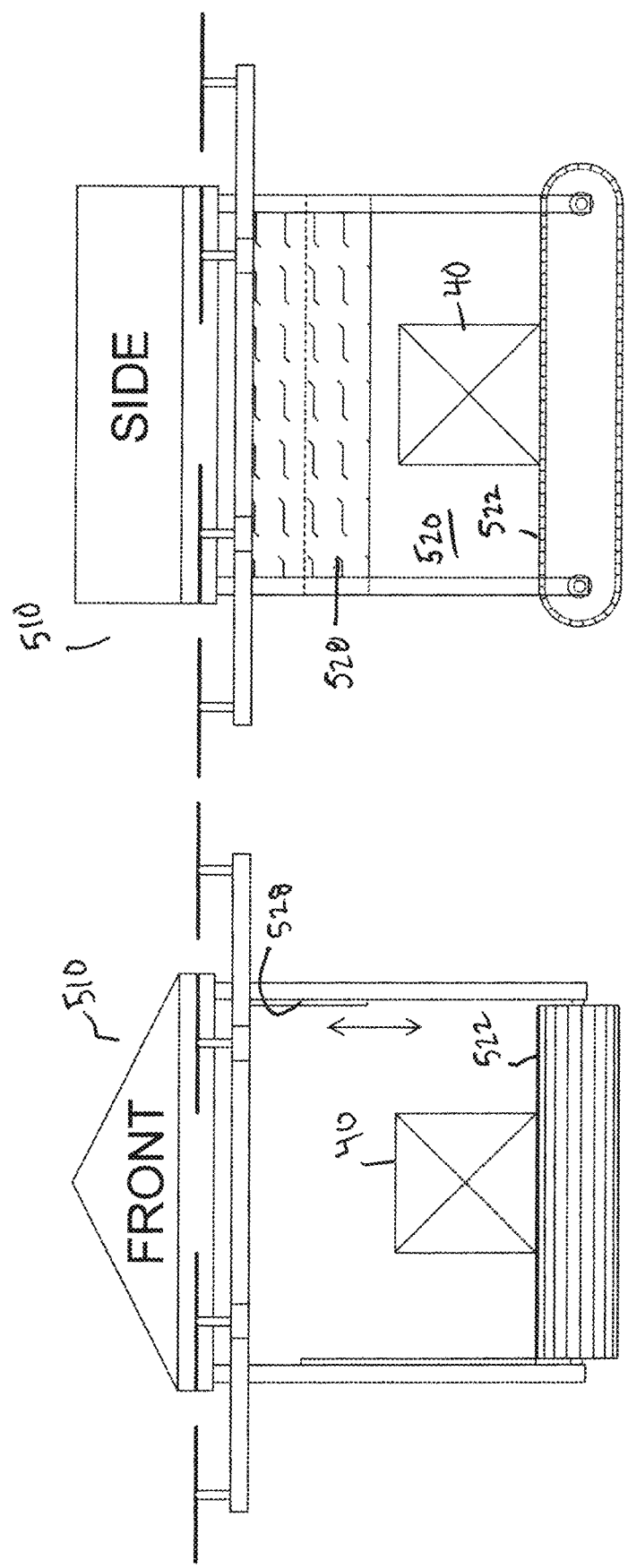

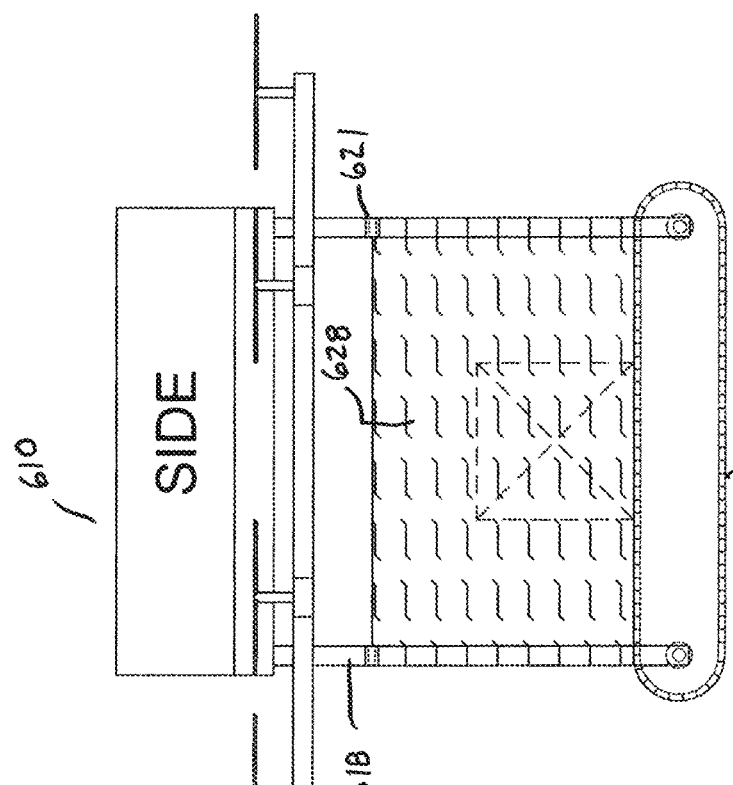
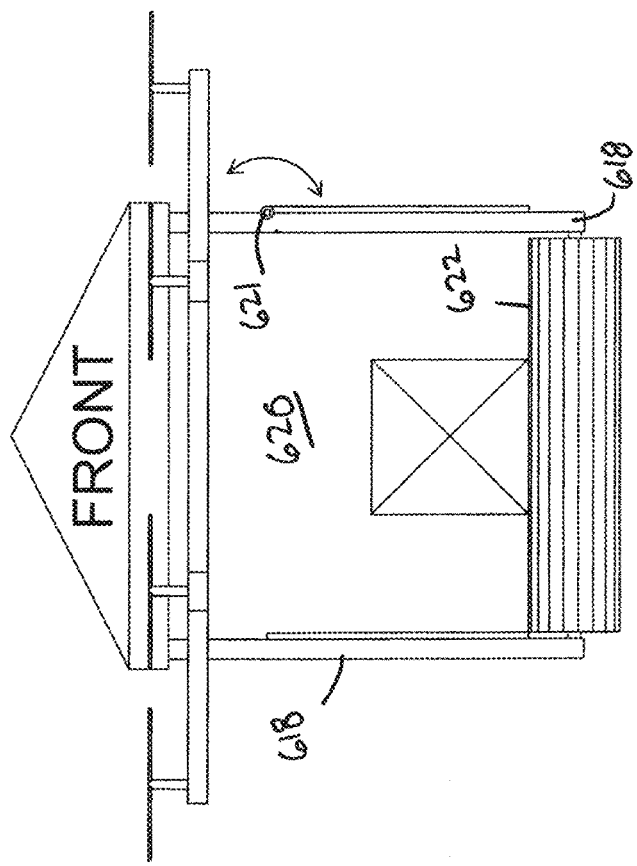

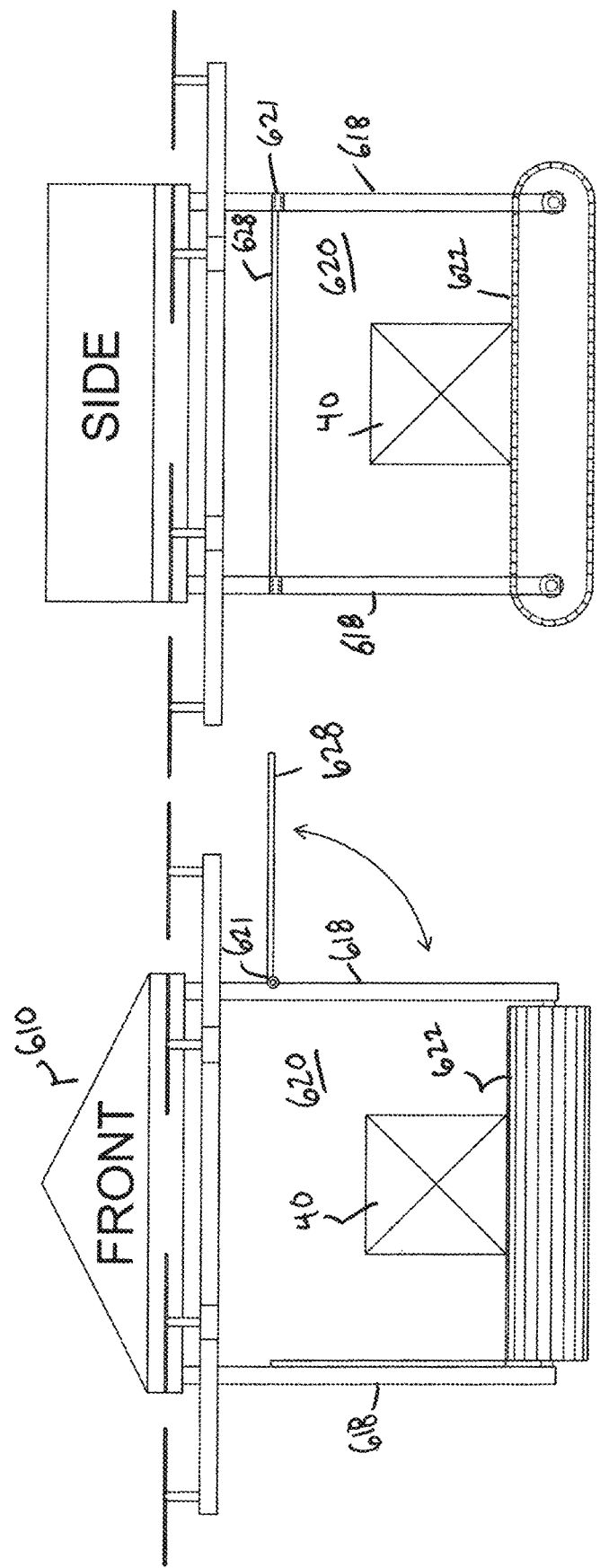

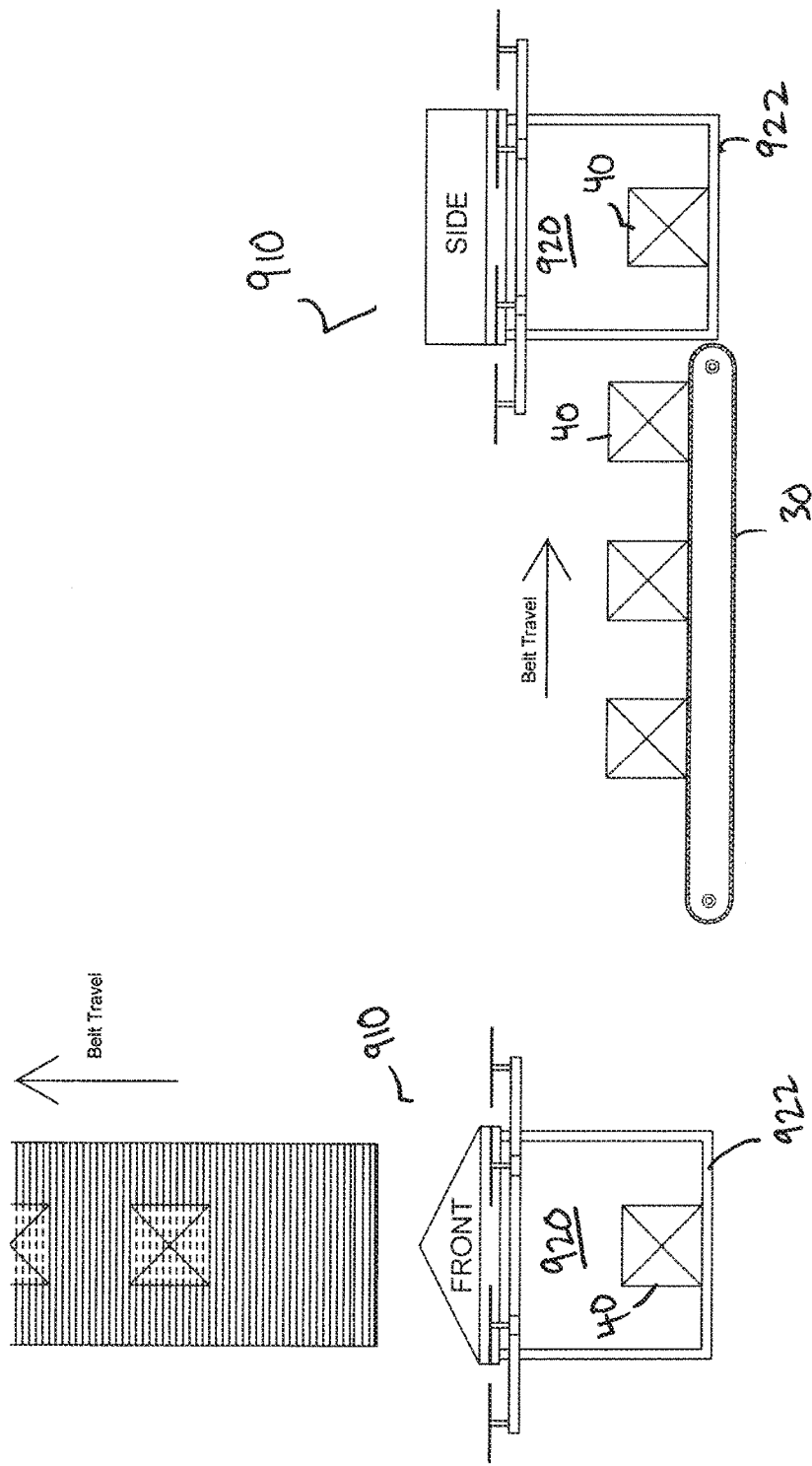

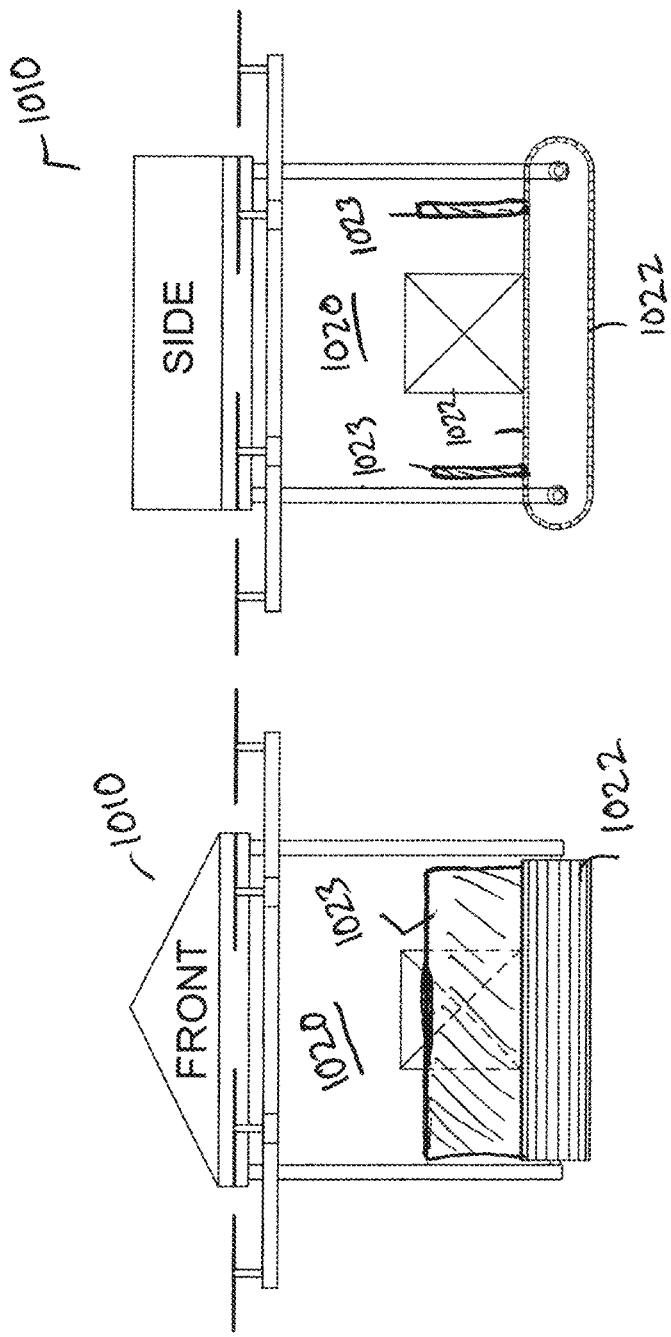

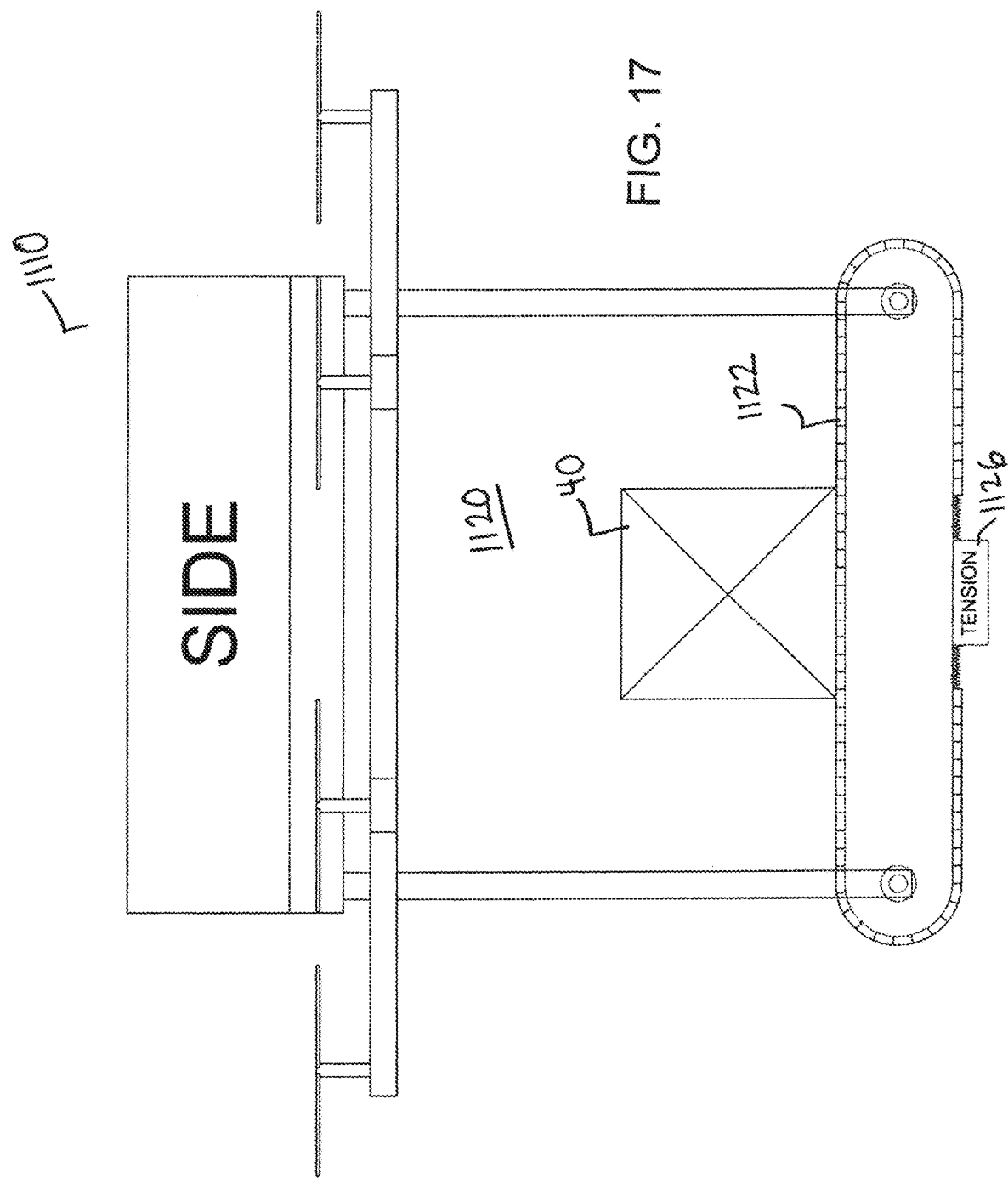

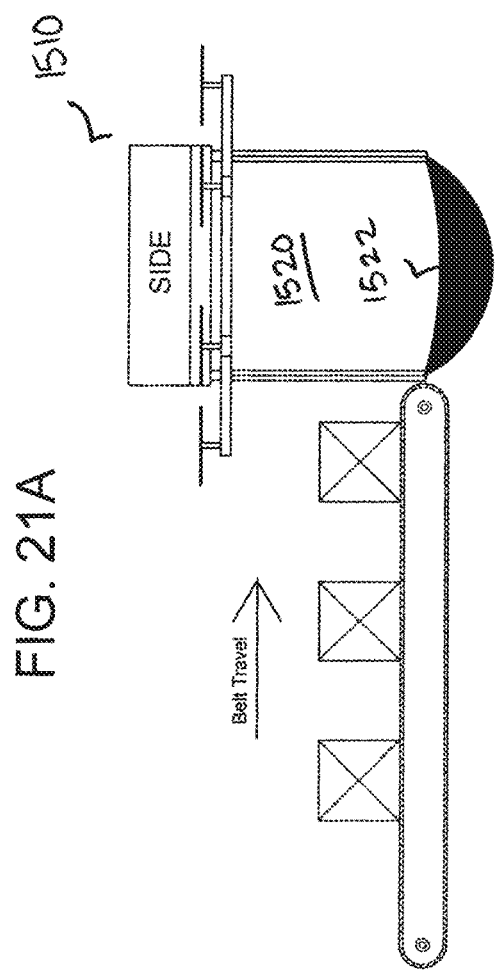
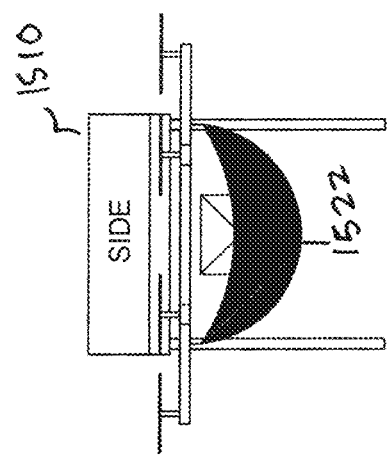
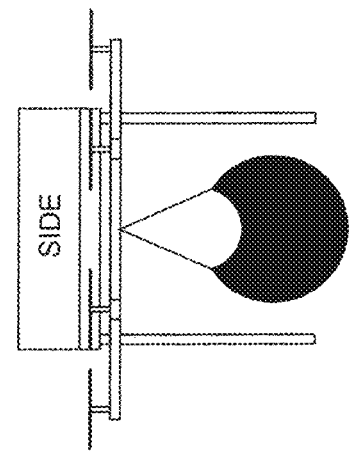
FIG. 21A
FIG. 21B
FIG. 21C

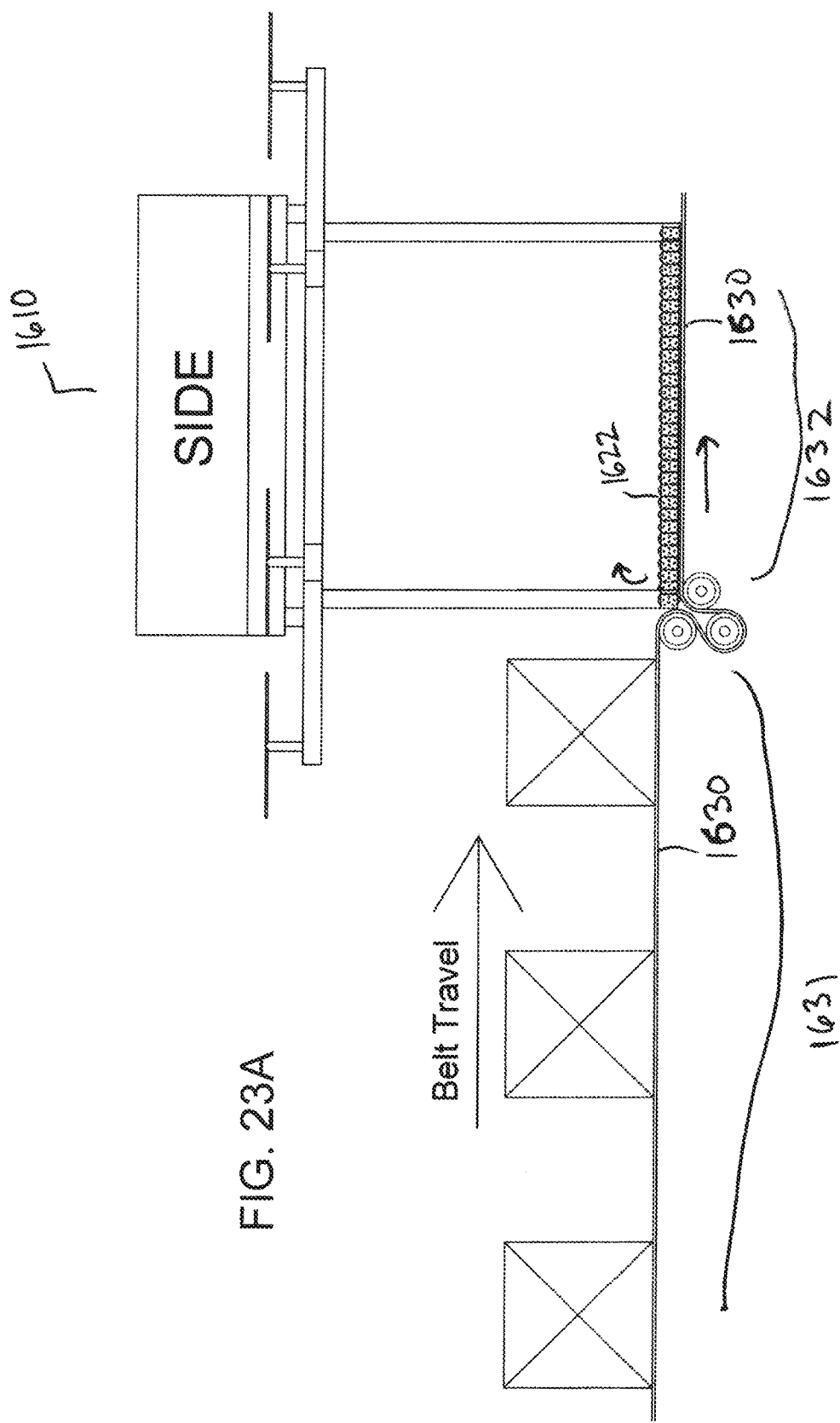

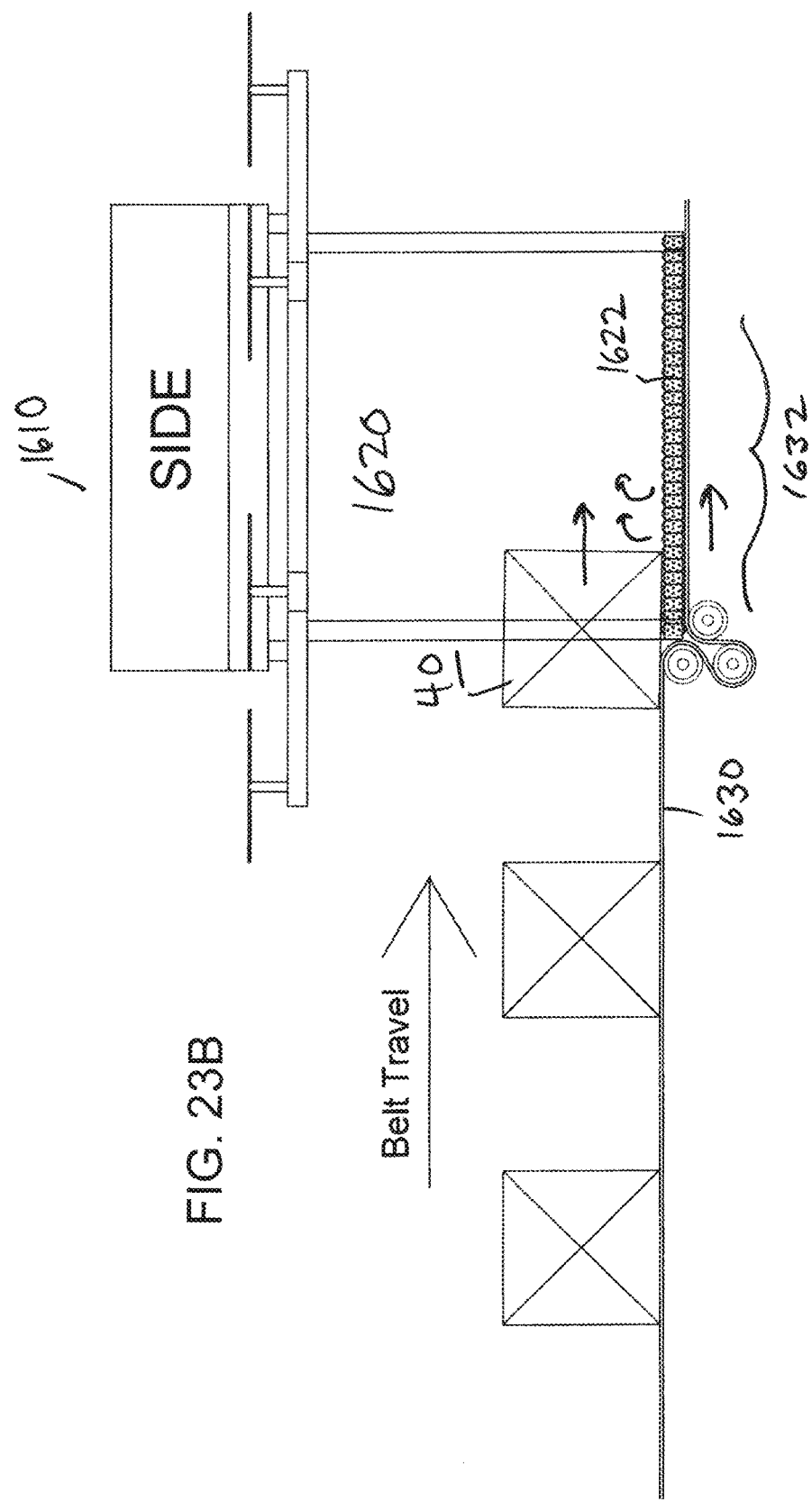

MATERIAL HANDLING SOLUTIONS FOR DRONES

RELATED APPLICATIONS

The present invention is a continuation of U.S. patent application Ser. No. 15/750,284, which entered the US National Phase on Feb. 5, 2018 and is a § 371 application of PCT/US16/046701, which claims priority to U.S. Provisional Patent Application Ser. No. 62/204,210, entitled "Material Handling Solutions for Drones", filed Aug. 12, 2015, the contents of which are herein incorporated by reference.

BACKGROUND

The invention relates generally to delivery of articles using drones. More particularly, the invention relates to the loading, retention and unloading of articles onto and from a drone.

Drones are unmanned aerial vehicles that may be used for a variety of purposes, such as delivering packages or transporting other articles. The current state of the art delivery drones use overhead grippers to secure a payload. This leaves the payload exposed and if the grip is not secure, the payload could fall from the sky. There is a need for a more secure, efficient and effective method for loading, retaining and unloading payload on a drone.

SUMMARY

The present invention provides a delivery drone that includes a dynamic support surface for carrying an article that facilitates loading and unloading of the article onto and from the drone. The dynamic support surface forms a floor of an article containment area.

According to one aspect, a drone comprises a frame, at least one propeller for generating aerodynamic lift, a controller for controlling the propeller and an article containment area for containing an article to be carried by the drone. The article containment area has a bottom formed by an array of rollers for supporting the article and allowing the article to move in, out or through the article containment area.

According to another aspect, a drone-loading system comprises a drone and a drive conveyor for conveying an article towards the drone. The drone has a frame, at least one propeller for generating aerodynamic lift, a controller for controlling the propeller, and an article containment area for containing an article to be carried by the drone. The article containment area has a bottom formed by an array of rollers for supporting the article and allowing the article to move in, out or through the article containment area. The drive conveyor forms a recessed area for landing the drone and drives the dynamic support surface to move articles into, out of or through the article containment area.

According to another aspect, a drone-loading system comprises a conveyor belt for conveying articles to be loaded into a drone and a drone. The conveyor belt waterfalls through one or more transition points to create multiple drone-loading zones. A drone is configured to land in a selected drone-loading zone. The drone comprise a frame, at least one propeller for generating aerodynamic lift, a controller for controlling the propeller and an article containment area for containing an article to be carried by the drone. The article containment area has a bottom formed by an externally-actuatable dynamic support surface for supporting the article. The conveyor belt selectively drives the externally-actuatable dynamic support surface to push articles into, out of or through the article containment area.

BRIEF DESCRIPTION OF THE DRAWINGS

These features and aspects of the invention, as well as its advantages, are described in more detail in the following description, appended claims, and accompanying drawings, in which:

FIG. 1A is a side view of a drone having a dynamic support surface and a drone loading system according to an embodiment of the invention;

FIG. 1B is a front view of the drone and drone loading system of FIG. 1A;

FIG. 1C is a top view of the drone and drone loading system of FIG. 1A;

FIG. 3 is a side view of a drone including LIM-driven motors in a loading system according to another embodiment of the invention;

FIGS. 9A-9D show a process of ejecting a payload from an article containment area onto a receiving surface;

FIGS. 11A-11D show a drone with a slidable sidewall;

FIGS. 12A-12D show a drone with a pivotable sidewall;

FIG. 15A is a front view of a drone having a dynamic support surface according to another embodiment of the invention;

FIG. 15B is a side view of the drone of FIG. 15A in a loading system;

FIGS. 16A-16D show a drone with a conveyor belt having flights according to another embodiment of the invention;

FIG. 17 is a side view of a drone with a tensioning device joining ends of a conveyor belt to form a dynamic support surface;

FIGS. 21A-21D show a drone having a dynamic support surface comprising a net or mesh bottom;

FIGS. 23A-23C show the drone of FIG. 22 in a conveying system that both loads the drone and drives the dynamic support surface according to another embodiment of the invention;

DETAILED DESCRIPTION

Figure 2:
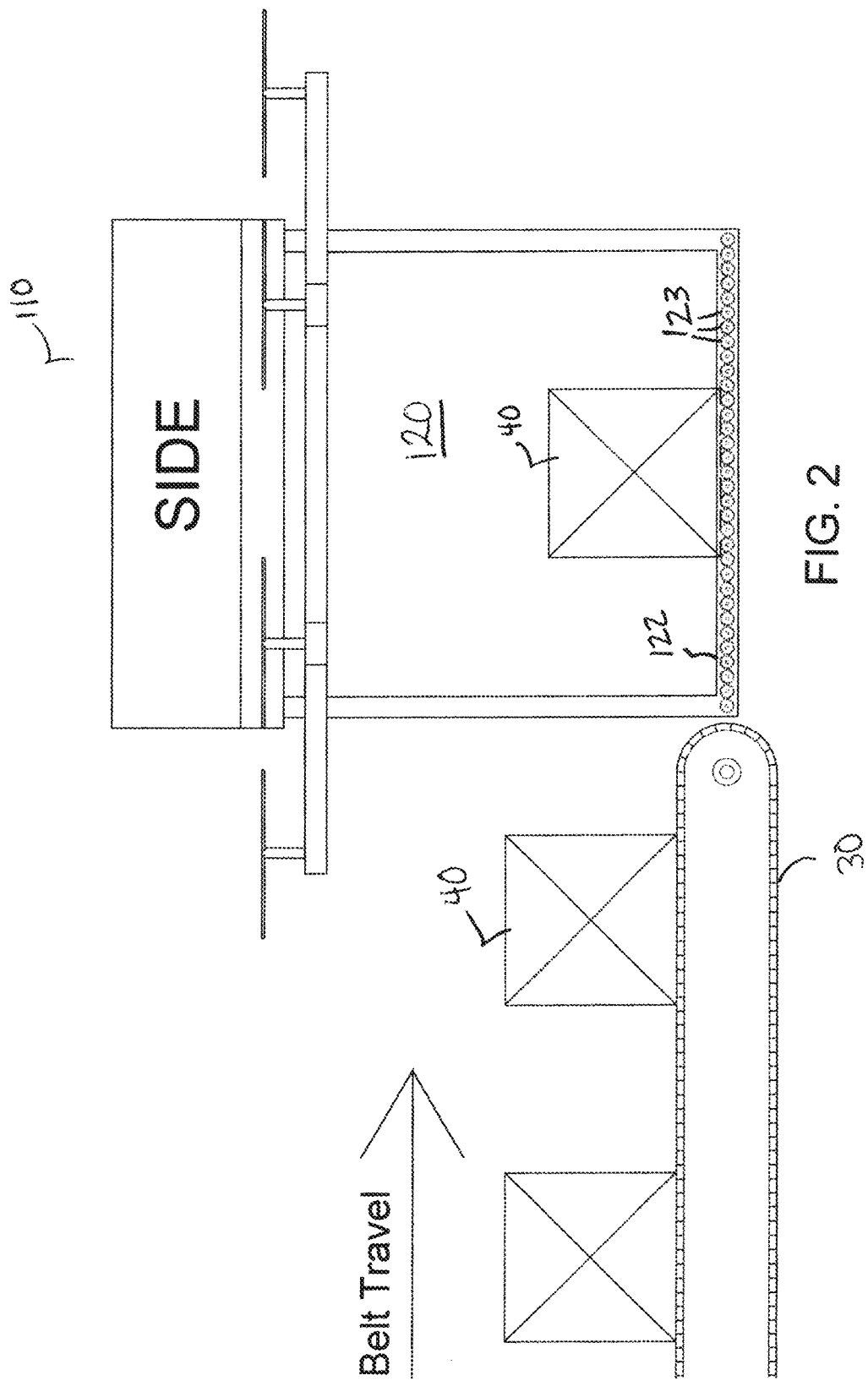
FIG. 2 is a side view of a drone having rollers in a loading system according to another embodiment of the invention.

The present invention provides a drone having a dynamic support surface for carrying an article. The invention will be described relative to certain illustrative embodiments, though those skilled in the art will recognize that the invention is not limited to the illustrative embodiments.

A drone 10 of an embodiment of the invention includes a frame 12, one or more propellers 14, shown as propeller blades, forming an aerodynamic surface that generates lift, a motor (not shown) for rotating the propellers 14 and a controller 16. The illustrative drone further includes an article containment area 20 for containing an article or payload to be delivered or otherwise moved using the drone. A dynamic support surface, shown as a conveyor belt 22, defines the bottom of the article containment area 20. The upper span of the conveyor belt forms the floor of the article containment area 20 for supporting an article within the article containment area. The lower span of the conveyor belt 22 may form the bottom of the drone. Legs 18 may extend down and connect the conveyor belt 22 to the frame 12. In the illustrative embodiment, the legs 18 couple to a shaft 19 upon which sprockets or other reversing elements for the conveyor belt 22 are mounted, but the invention is not so limited. Alternatively, the legs 18 or other part of the frame can attach to support structure (not shown) that holds the conveyor belt 22 and associated components.

As used herein, a "dynamic support surface" refers to a surface that allows movement of an article into and out of an article containment area of a drone and that supports the article from the bottom while the article is in an article containment area of the drone. Examples include, but are not limited to, conveyor belts, rollers, low friction flat surfaces, a flexible surface, mesh, a movable surface and other surfaces that would be apparent to one of ordinary skill in the art and combinations thereof.

An external conveyor 30 feeds articles 40 to the article containment area 20. The conveyor belt 22 forming the dynamic support surface may be powered or idle. For example, a motor (not shown) may drive the conveyor belt 22 in the same direction as the external conveyor 30 to pull an article brought to the first end of the conveyor belt 22 adjacent the external conveyor 30 into the article containment area. In one embodiment the external conveyor and the conveyor belt 22 move at the same speed, though the invention is not limited. In another embodiment, the conveyor belt 22 is passive, so that the momentum of an article coming off the external conveyor 30 pushes the conveyor belt so that the article 40 moves into the article containment area. Also, the conveyor belt 22 may be capable of reversing. Other suitable loaders may be used to feed articles to the article containment area 20, such as an injection or queuing chute. The loader may have pop-up stops to control the loading of packages. The drone can be inclined to match the angle of the loader.

While the illustrative article containment area 20 is below the propellers, in another embodiment of the invention, the article containment area is above the propellers or in another suitable location.

The conveyor belt 22 forming an embodiment of a dynamic support surface can comprise any suitable type of conveyor. For example, the conveyor belt can be a positive drive conveyor belt, a friction driven conveyor belt or other type of conveyor belt. The conveyor belt can be formed of plastic, stainless steel, rubber or any suitable material. The conveyor belt can be a flat or textured. The conveyor belt can have a closed or open surface and comprise rollers, slats or any other feature suitable for moving articles.

In another embodiment, the conveyor belt 22 is driven via a worm gear extending through a drone leg, allowing the motor and other electrical components to be housed in the main body of the drone. In another embodiment, a timing belt driven by a motor in the main body connects the motor to the shaft 19 that turns the conveyor belt.

In one embodiment, shown in FIG. 2, a dynamic support surface 122 forming a bottom of an article containment area 120 of a drone 110 may comprise a series of rollers 123. The rollers 123 may be passive, motor-driven or driven externally. The rollers 123 may be driven externally by placing a driver, such as a conveyor belt, roller, magnet, coil or other suitable driver, below the dynamic support surface 122 to cause the rollers 123 to rotate and guide an article into or out of the article containment area 120.

In another embodiment, shown in FIG. 3, a dynamic support surface 222 forming a bottom of an article containment area 220 of a drone 210 may comprise a series of Linear Induction Motor-driven roller 223. Coil 224 selectively drives the rollers 223 to position an article within the article containment area 220.

Figure 4A:
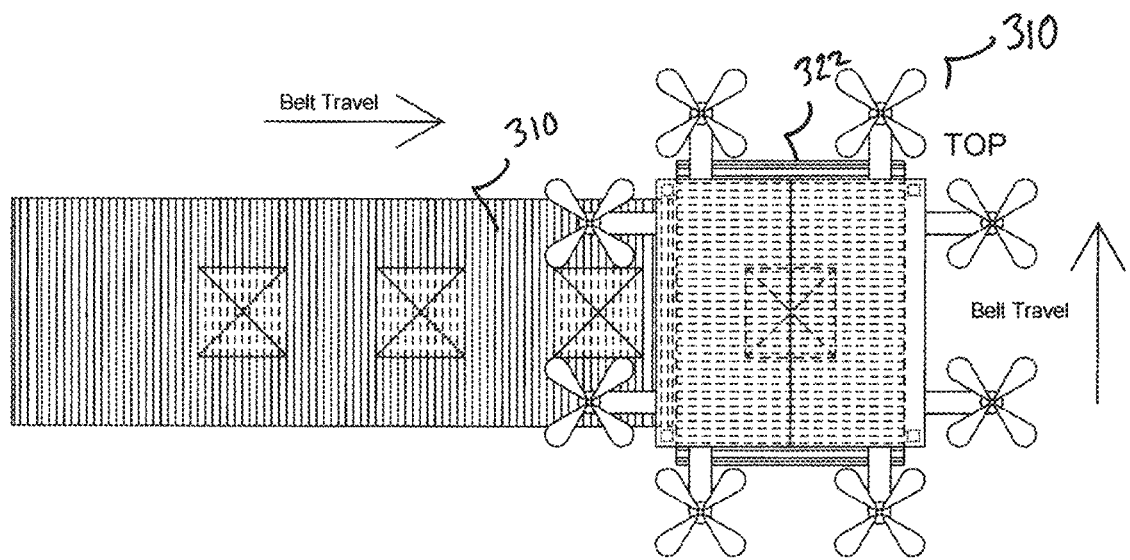
FIG. 4A is a top view of a drone and drone loading system in which the drone is loaded from the side.
Figure 4B:
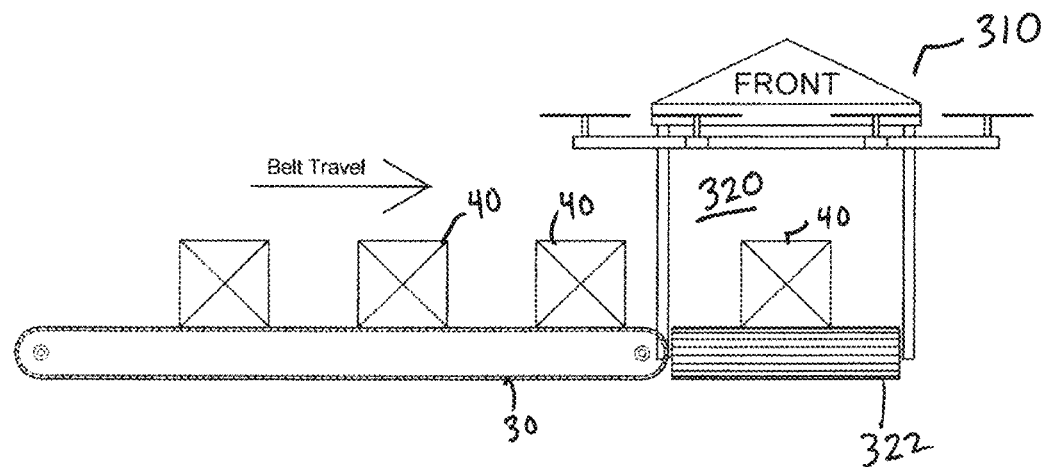
FIG. 4B is a side view of the drone and drone loading system of FIG. 4A.

The dynamic support surface may have any suitable orientation relative to an external conveyor. For example, in FIG. 1, the dynamic support surface 22 is parallel to and aligned with the external conveyor belt 30. In another embodiment, shown in FIGS. 4A and 4B, an external conveyor belt 30 and conveyor belt 322 forming dynamic support surface are perpendicular. The article 40 to be supported in the article containment area 320 is loaded from the side of the drone 310.

Figure 5:
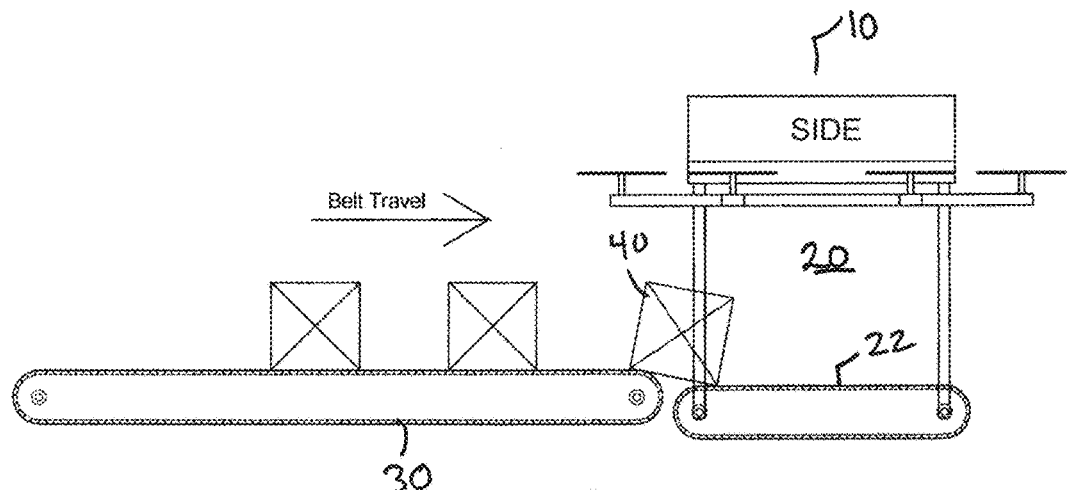
FIG. 5 is a side view of a drone and loading system in which a dynamic support surface of the drone has a different elevation than a loading surface.

As shown in FIG. 5, a conveyor belt 22 or other dynamic support surface in a drone 10 can be placed at a lower elevation than an external conveyor belt 30 to facilitate loading of an article 40 into an article containment area 20 of the drone 10.

Figure 6:
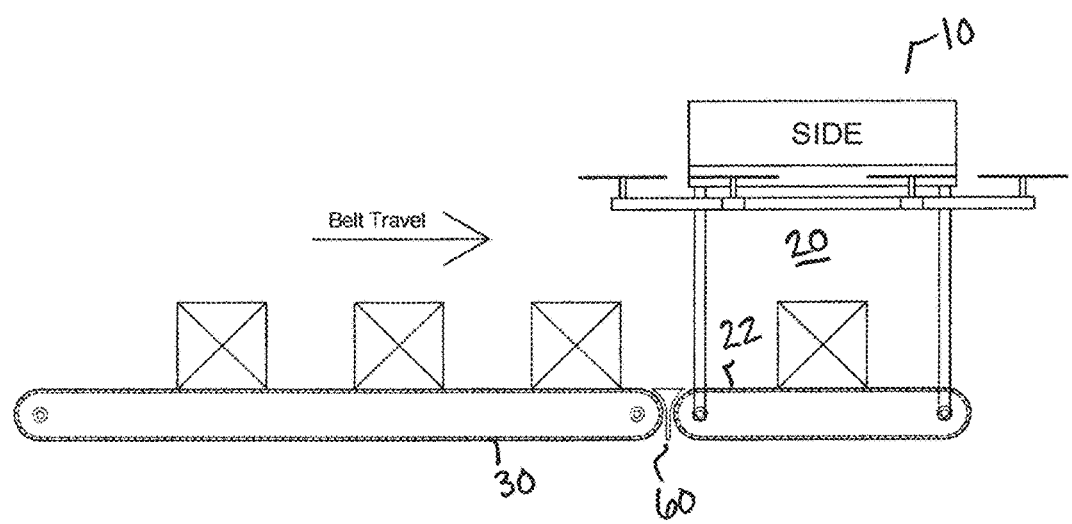
FIG. 6 is a side view of a drone and loading system including a transfer plate.

As shown in FIG. 6, a transfer plate 60 can be placed between a conveyor belt 22 or other dynamic support surface in a drone 10 and an external conveyor belt 30 to facilitate transfer of an article 40 into an article containment area 20 of the drone 10.

Figure 7:
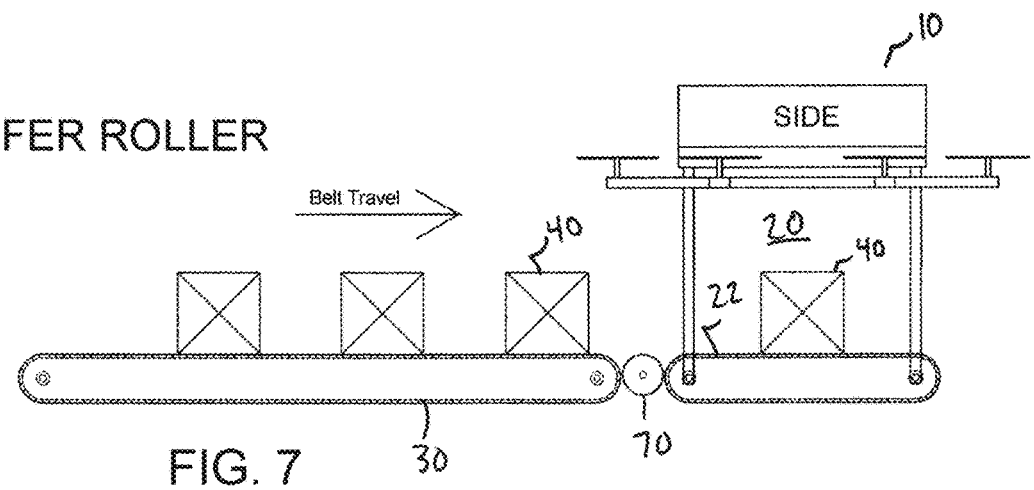
FIG. 7 is a side view of a drone and loading system including a transfer roller.

As shown in FIG. 7, a transfer roller 70 can be placed between a conveyor belt 22 or other dynamic support surface in a drone 10 and an external conveyor belt 30 to facilitate transfer of an article 40 into an article containment area 20 of the drone 10.

Figure 8:
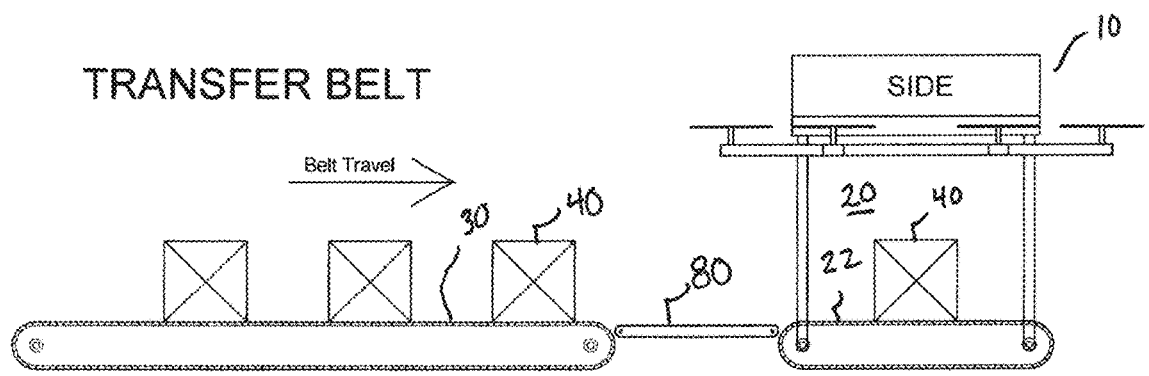
FIG. 8 is a side view of a drone and loading system including an intermediate transfer conveyor.

As shown in FIG. 8, an intermediate transfer conveyor belt 80 can be placed between a conveyor belt 22 or other dynamic support surface in a drone 10 and an external conveyor belt 30 to facilitate transfer of an article 40 into an article containment area 20 of the drone 10.

Figure 9A:
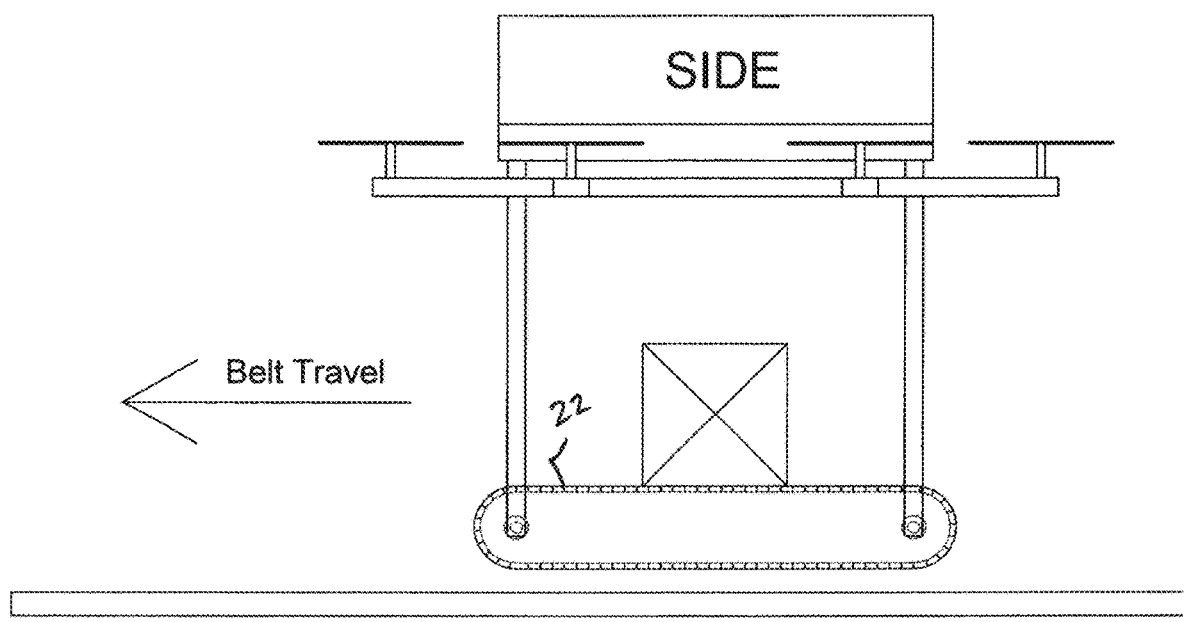
Figure 9D:
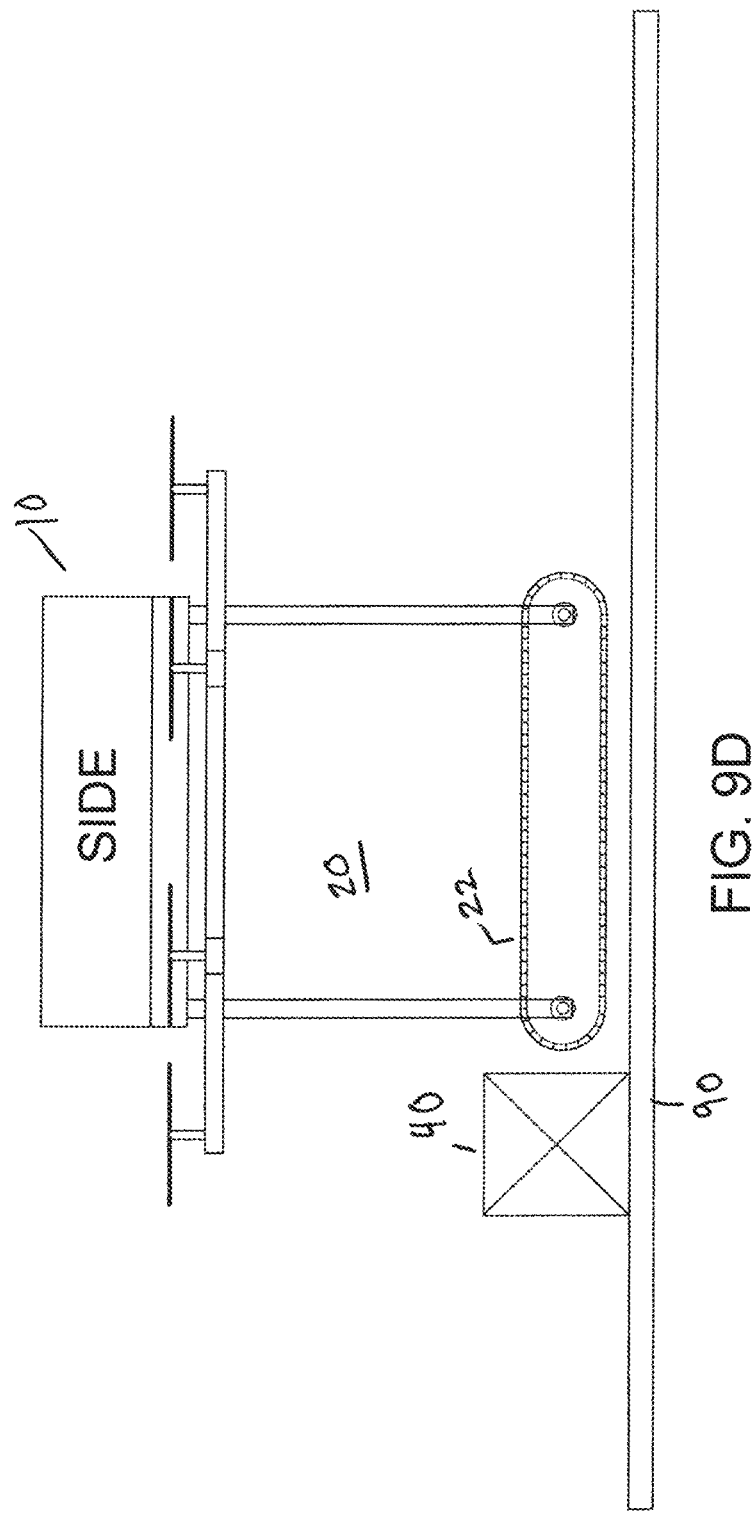

As shown in FIGS. 9A-9D, a dynamic support surface 22 forming a bottom of an article containment area 20 of a drone 10 can also be used to eject a carried article 40 at a desired location. FIG. 9A shows the article 40 in a central position within the article containment area 20. When signaled, the conveyor belt 22 moves towards a side of the article containment area 20 to move the article 40 towards the side, as shown in FIG. 9B. As shown in FIG. 9C, the conveyor belt 22 continues to move to push the article 40 out of the article containment zone 20, where it lands on a receiving surface 90, as shown in FIG. 9D. Any suitable means for receiving a package from a drone with a dynamic support surface may be used. In one embodiment, a receiver for a drone has a chute onto which the drone will deposit the package. The edge of the chute may be designed to hold the shaft of the drone's conveyor belt 22, allowing the drone to tile forward to dump a package. The receiver and drone can be connected through any suitable means.

Figure 10B:
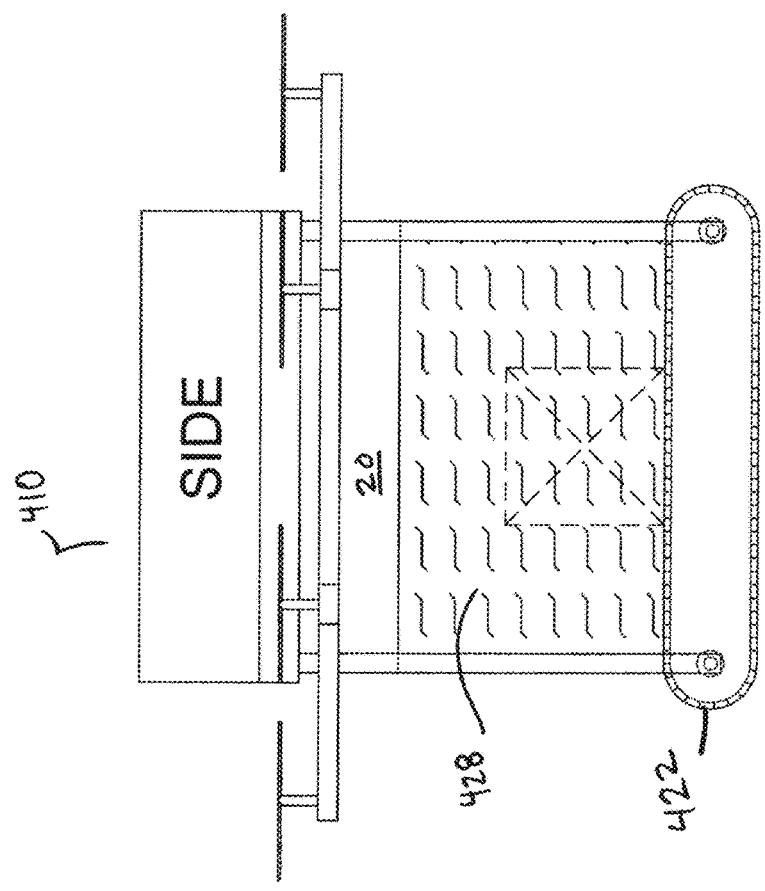
FIG. 10B is a side view of the drone of FIG. 10A.
Figure 10A:
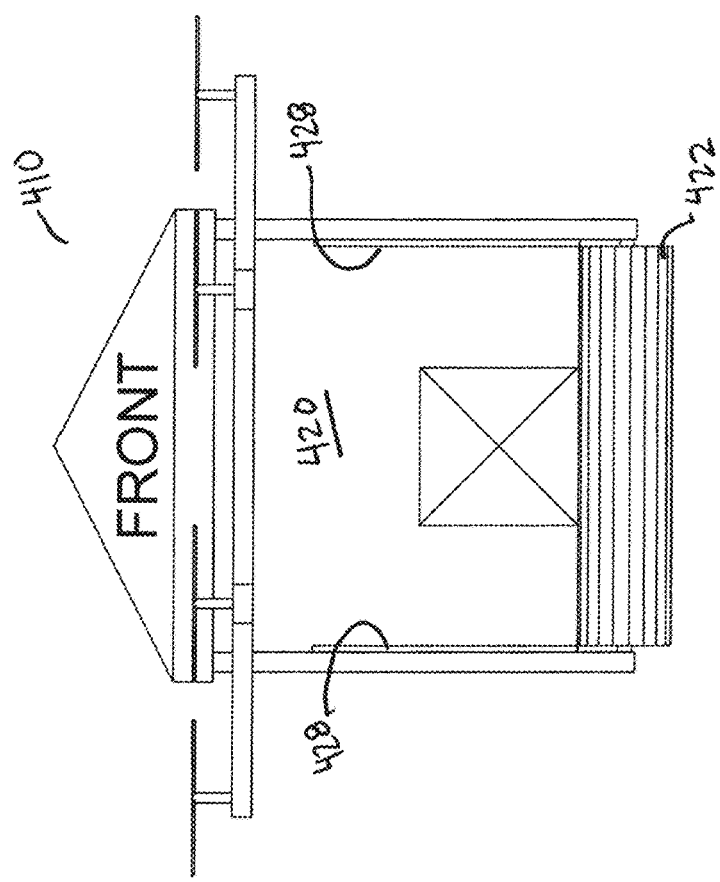
FIG. 10A is a front view of a drone with a dynamic support surface and sidewalls for protecting a payload.

In another embodiment of the invention shown in FIGS. 10A and 10B, a drone 410 having a dynamic support surface, such as a conveyor belt 422, in an article containment area 420 may include sidewalls 428 for protecting a payload 40. The sidewalls 428 form sides of the article containment area 420 adjacent to the side edges of the conveyor belt 422, and may be movable or fixed. The sidewalls 428 may also be located at the front and back walls of the article containment area. The sidewalls 428 may include air baffles to prevent strong gusts of winds from moving lightweight packages within the article containment area.

As shown in FIGS. 11A-11D, a sidewall 528 of an article containment area 520 of a drone 510 may slide up and down to open up the article containment area 520 to allow loading or unloading of an article to or from a dynamic support surface, such as a conveyor belt 522.

As shown in FIGS. 12A-12D, a sidewall 628 of an article containment area 620 of a drone 610 may be pivotally connected to the legs 618. The side wall 628 may rotate about the pivot point 621 to open up the article containment area 620 to allow loading or unloading of an article to or from a dynamic support surface, such as a conveyor belt 622. The side wall 628 may pivot down to close the article containment area 620. Alternatively, the side wall pivot may be at the bottom of the article containment area, so that the side wall 628 swings down to open the article containment area, perhaps forming a ramp to transition articles out of the article containment area.

Figure 13A:
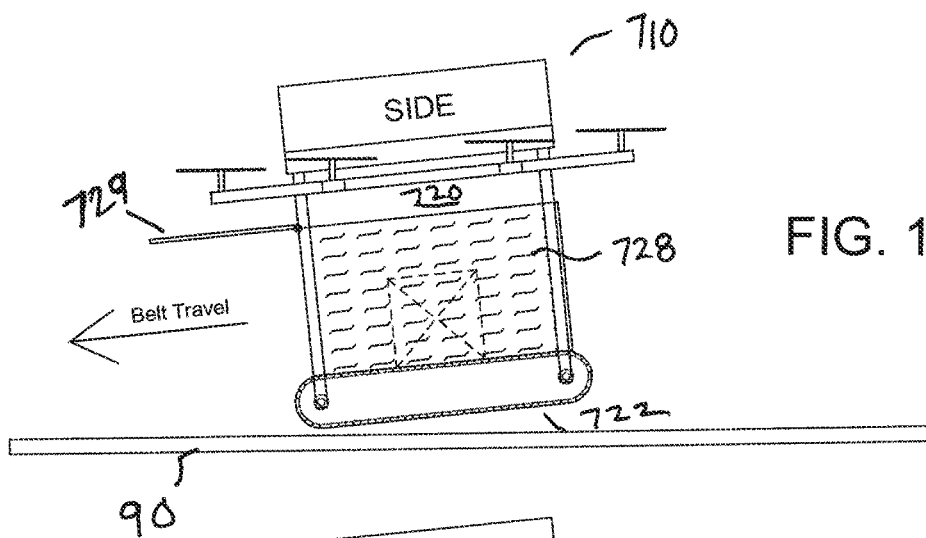
FIGS. 13A and 13B show a rotatable drone that moves to place a dynamic support surface at a decline to facilitate discharge of a payload.
Figure 13B:
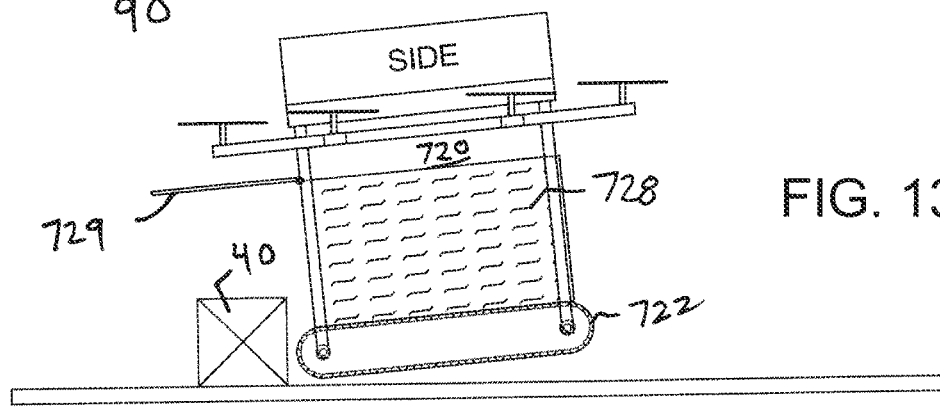

As shown in FIGS. 13A and 13B, a drone 710 with sidewalls 728 enclosing an article containment area may rotate to place the dynamic support surface, shown as conveyor belt 722, at a decline to facilitate discharge of an article 40 from the article containment area 720 onto a receiving surface 90. In the embodiment of FIG. 13A, a front wall 729 pivots up as the conveyor belt 722 moves the article towards the front of the article containment area 720. The conveyor belt 722 discharges the article 40 onto a receiving surface 90. The receiving surface can be any suitable surface, such as a chute, a receiving vehicle, slide, a conveyor belt and other receivers known in the art.

Figure 14A:
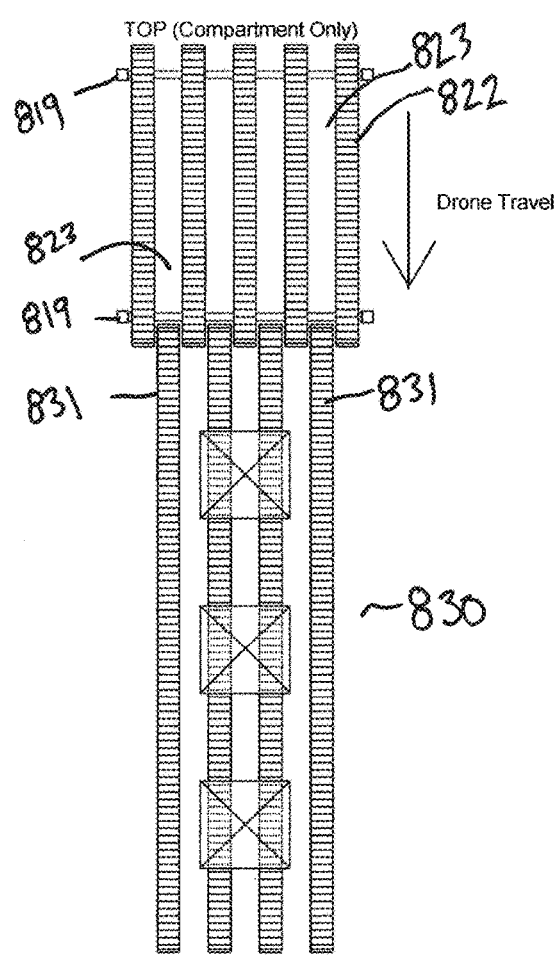
FIG. 14A is a top view of a drone and loading system where a dynamic support surface forming a bottom of an article containment area comprises a series of narrow conveyor belts according to another embodiment of the invention.
Figure 14B:
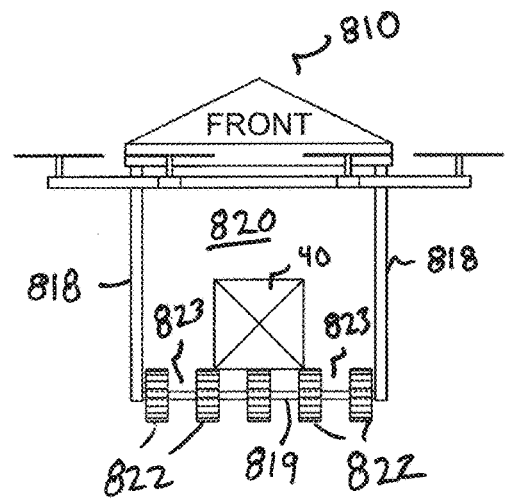
FIG. 14B is a front view of the drone and loading system of FIG. 14A.

In another embodiment of the invention, shown in FIGS. 14A and 14B, a dynamic support surface forming a bottom of an article containment area 820 for containing an article within a drone 810 comprises a series of narrow conveyor belts 822. The conveyor belts 822 are mounted on a common shaft 819 that connects to the legs 818 of the drone 810. An external conveyor 830 comprises a series of parallel narrow conveyor belts 831 that align with gaps 823 between the narrow conveyor belts 822 forming the dynamic support surface.

The dynamic support surface is not limited to a conveyor belt. For example, as shown in FIGS. 15A and 15B, a drone 910 may include an article containment area 920 comprising a low-friction floor 922. An article 40 unloaded from an external conveyor 30 is carried by the momentum imparted from the external conveyor 30 into the article containment area 920 across the low-friction floor 922.

Figure 16C:
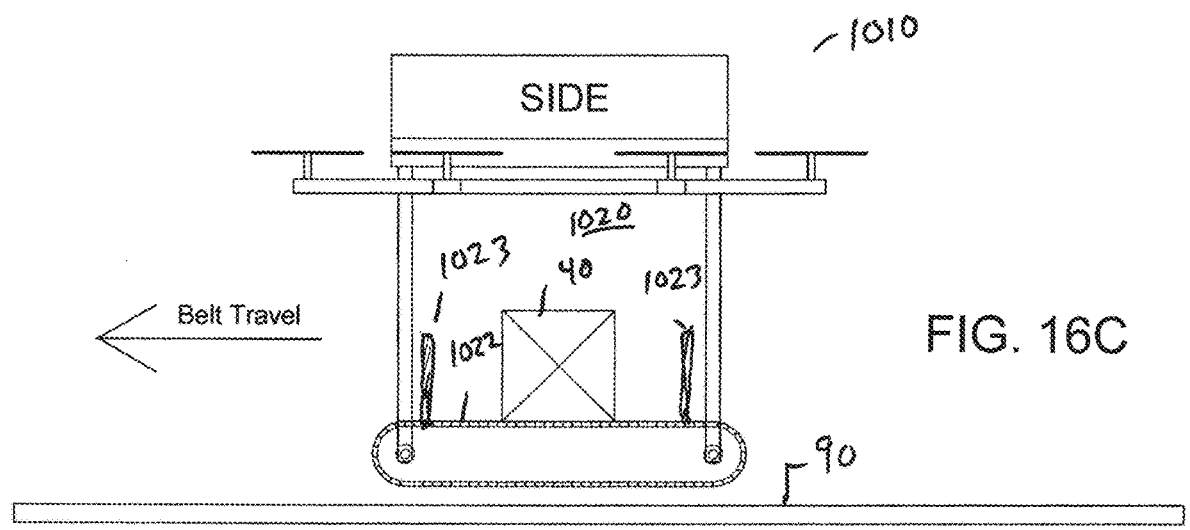
Figure 16D:
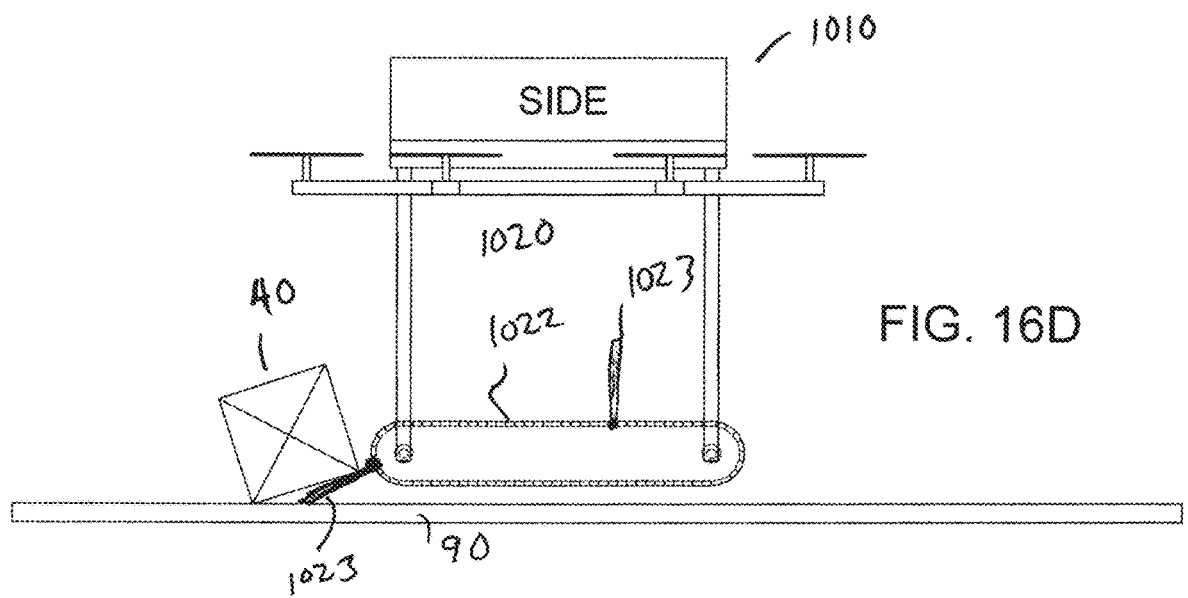

According to still another embodiment of the invention, shown in FIGS. 16A-16D, a dynamic support surface for an article containment area 1020 of a drone 1010 may comprise a conveyor belt 1022 having flights 1023 to contain the payload on the conveyor belt 1022. When the conveyor belt 1022 discharges an article 40 from the article containment area 1020, the flight 1023 may form a ramp, as shown in FIG. 16D to guide the article 40 onto a receiving surface 90. The article containment area 1020 of FIGS. 16A-16D may also include side guards, as described above, which may be coupled to the frame, or integral with or coupled directly to the conveyor belt 1022. Conveyor belts with sideguards are well known in the art. The drone may include clamps, pivots or other suitable means for securing flights, sideguards and sidewalls to secure a payload within an article containment area. In another embodiment, a sidewall of an article containment area may pivot down to form a ramp to guide a product into or out of the article containment area 1020.

In another embodiment of the invention, shown in FIG. 17, a dynamic support surface 1122 of a drone 1110 comprises an incomplete conveyor belt that does not form a complete surface. In the illustrative embodiment, a tensioning device 1126 couples the ends of the belt 1122. Other means of forming a movable surface that forms a bottom of an article containment area 1120 may be used.

Figure 18A:
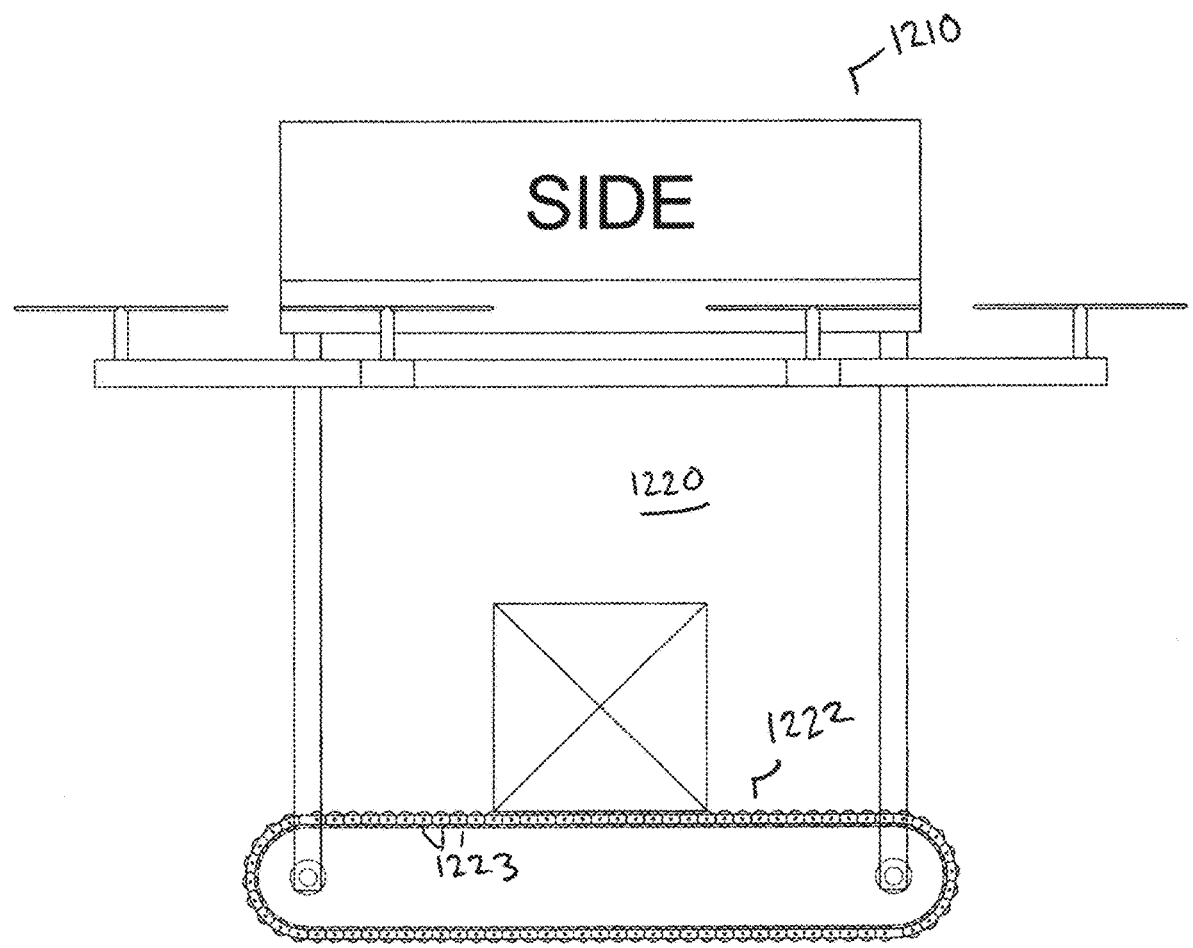
FIGS. 18A and 18B show a drone having a dynamic support surface comprising a conveyor belt with rollers according to another embodiment of the invention.
Figure 18B:
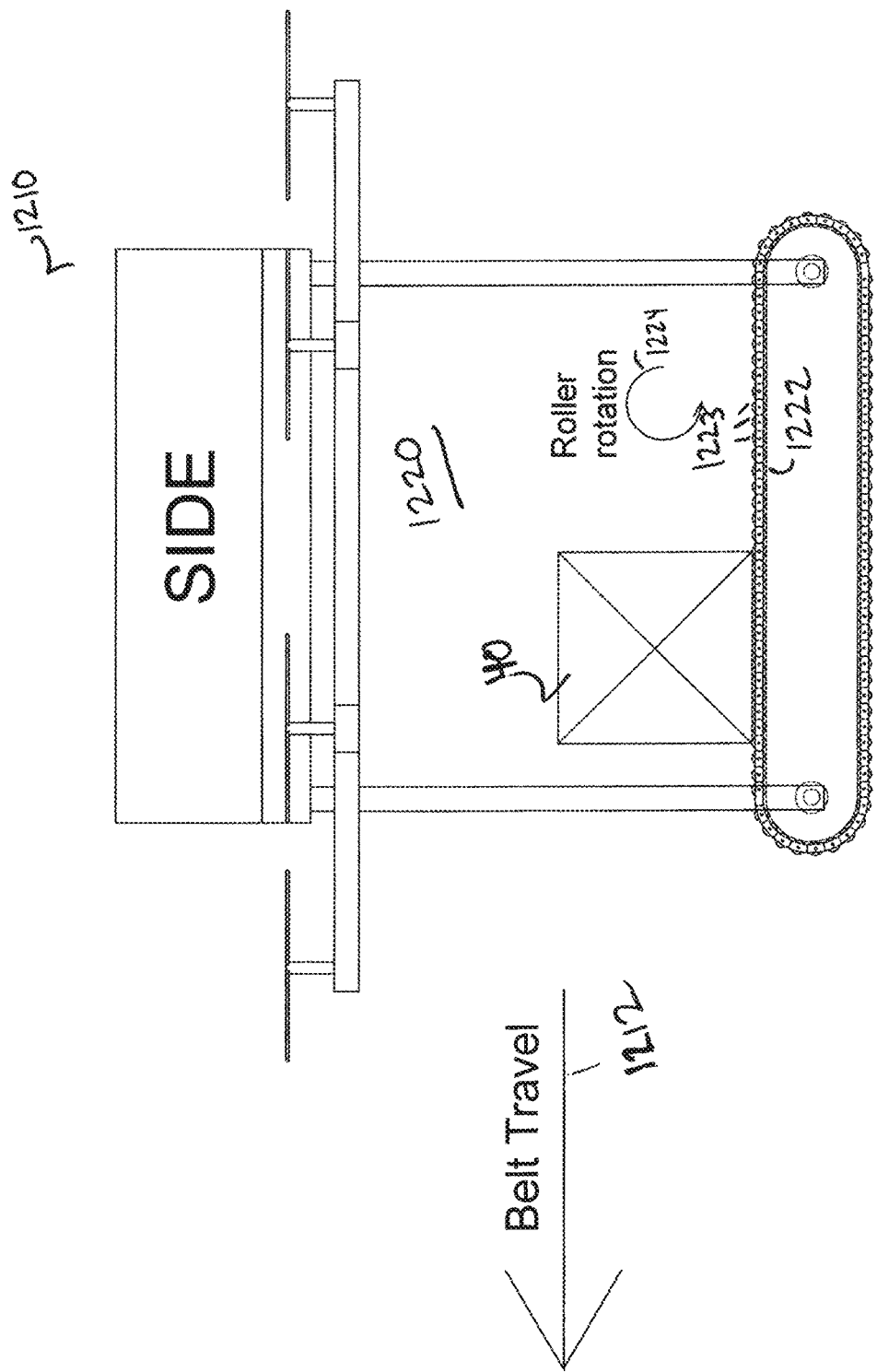

Referring to FIGS. 18A and 18B, a drone 1210 may comprise an article containment area 1220 having a conveyor belt 1222 with rollers 1223 forming the floor of the article containment area 1220. The illustrative rollers 1223 protrude above and below the conveyor belt top and bottom surfaces, and an article 40 is supported by the outer top surfaces of the rollers 1223. The bottoms of the rollers may contact a drive surface below the carryway of the conveyor belt 1222. As shown in FIG. 18B, when the conveyor belt 1222 moves in direction 1212, the drive surface activates the rollers to rotate in direction 1224, pushing the article 40 at a speed that is twice the speed of the conveyor belt 1222.

Figure 19:
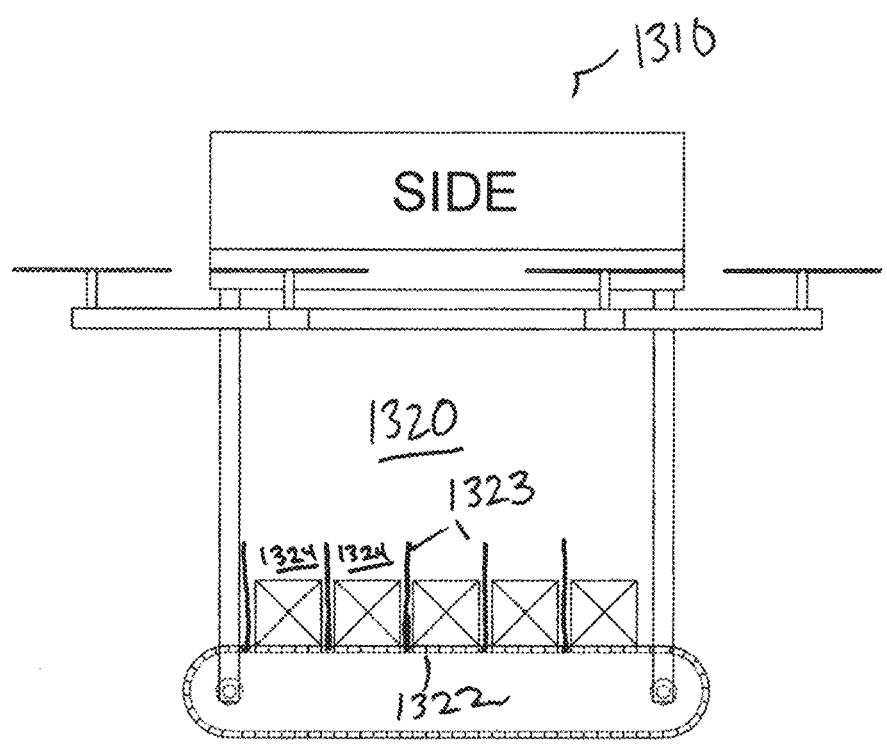
FIG. 19 is a side view of a drone having a dynamic support surface comprising a conveyor belt with flights according to another embodiment of the invention.

As shown in FIG. 19, a conveyor belt 1322 forming a bottom floor of an article containment area 1320 of a drone 1310 may include multiple lateral flights across the length of the belt to divide the article containment area 1320 in to a plurality of compartments 1324 for allowing multiple articles to be orderly stowed in the article containment area. Alternatively, the flights 1323 may extend longitudinally to divide the belt into a plurality of lanes for carrying multiple articles 40.

Figure 20A:
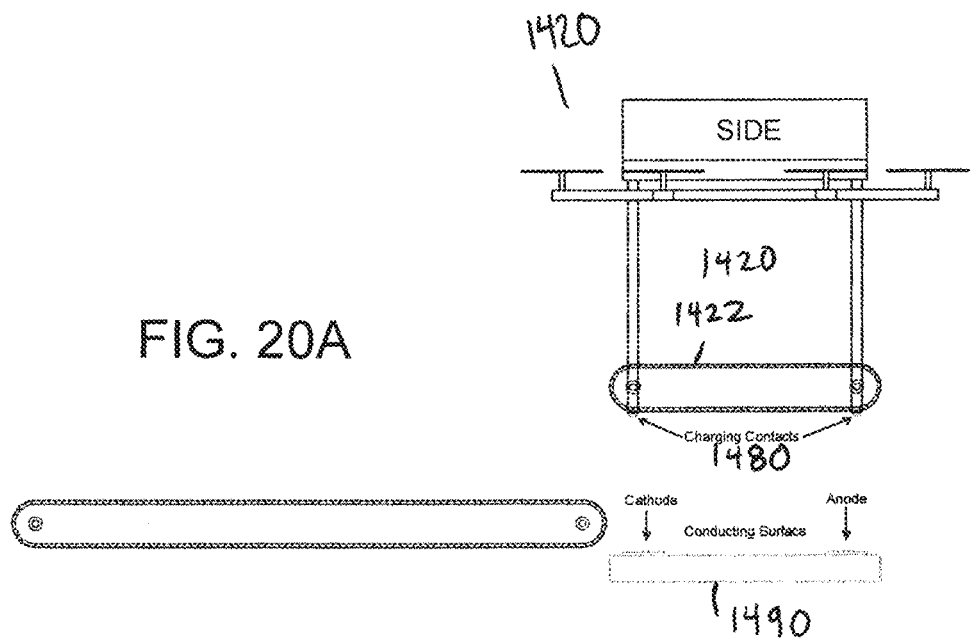
FIGS. 20A and 20B show a drone having a dynamic support surface comprising a conveyor belt and including charging contacts for recharging the drone at a charging station.
Figure 20B:
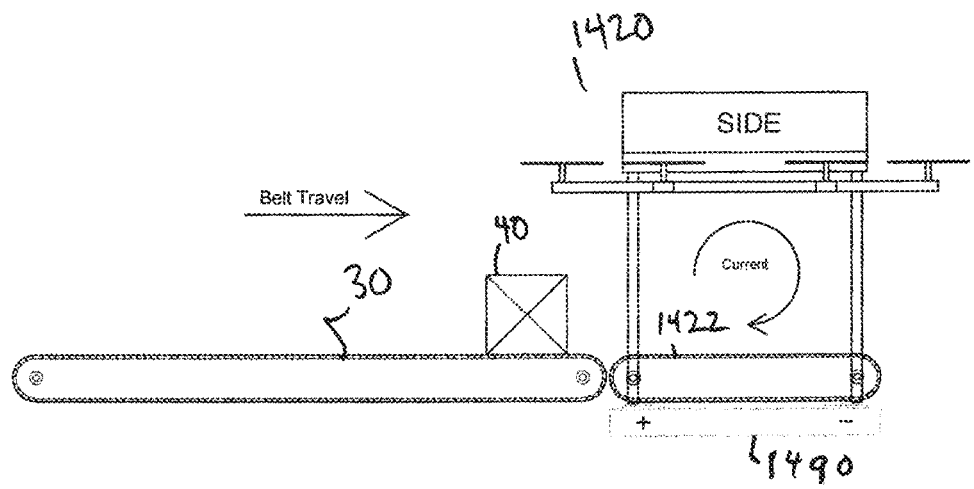

According to another embodiment of the invention, shown in FIGS. 20A and 20B, a drone 1410 having a dynamic support surface comprising a conveyor belt 1422 that forms a bottom of an article containment area 1420 may also include charging contacts 1480 for recharging the drone 1410 at a charging station 1490. The drone 1410 may be loaded with an article 40 from an external conveyor 30 while the drone 1410 charges. The batteries in the drone may be charged while the drone is in a queue to be loaded with an article or unloaded. Any suitable means for charging the drones while they wait for loading or unloading may be used.

Figure 21D:
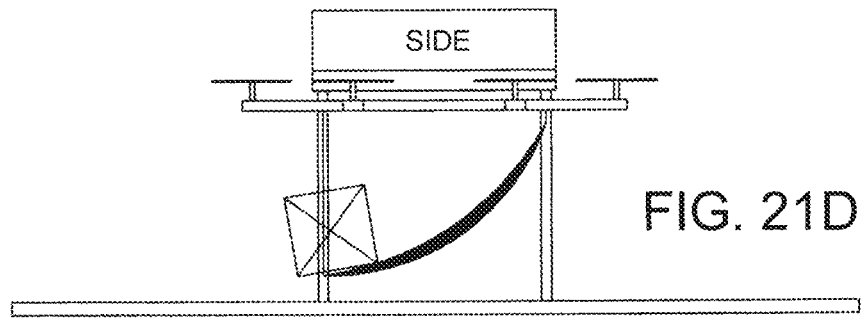

Referring to FIGS. 21A-21C, an article containment area 1520 of a drone 1510 may have a net or mesh bottom 1522 forming the dynamic support surface. Articles may be loaded into the article containment area 1520 from an external conveyor 30. The edges of the net or mesh bottom 1522 may be raised to secure an article and lowered to release the article 40.

Figure 22:
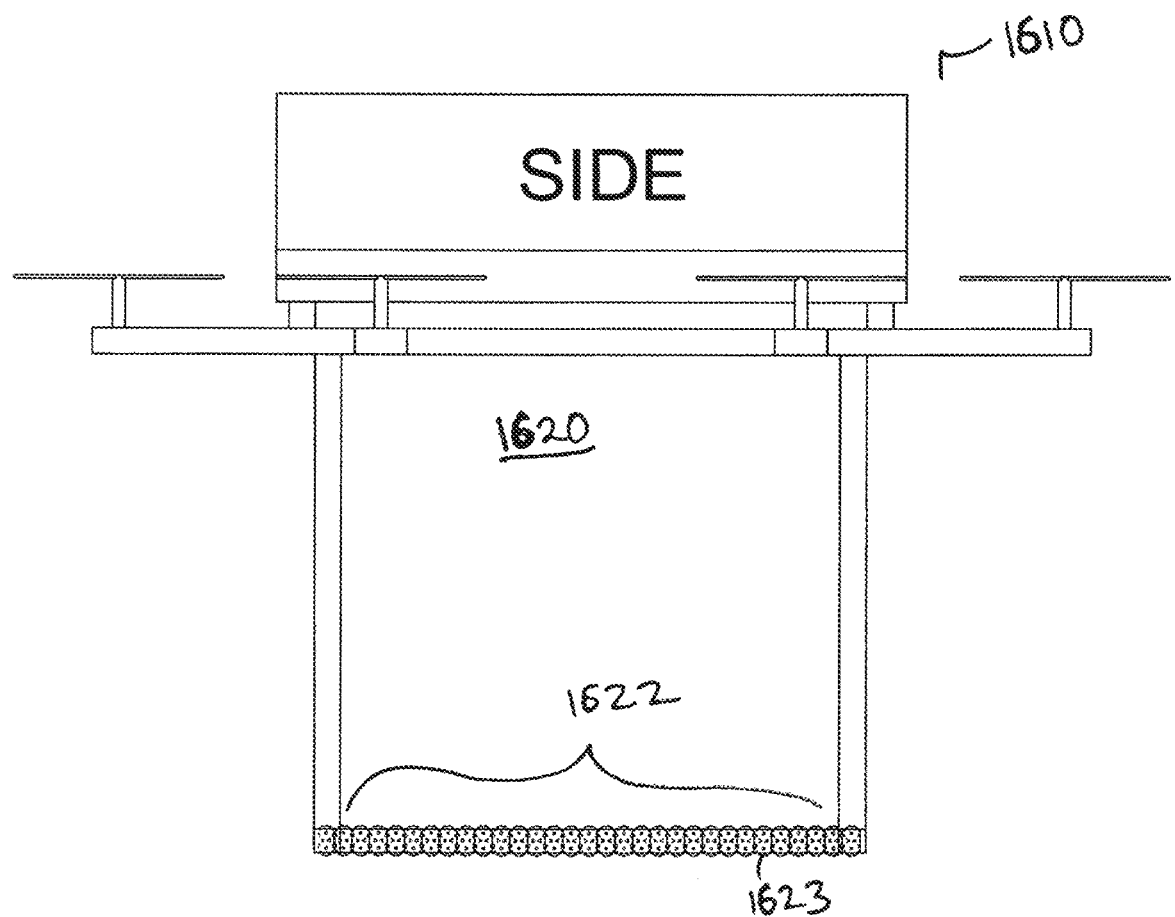
FIG. 22 is a side view of a drone having a dynamic support surface comprising mutually-actuating rollers.
Figure 23C:
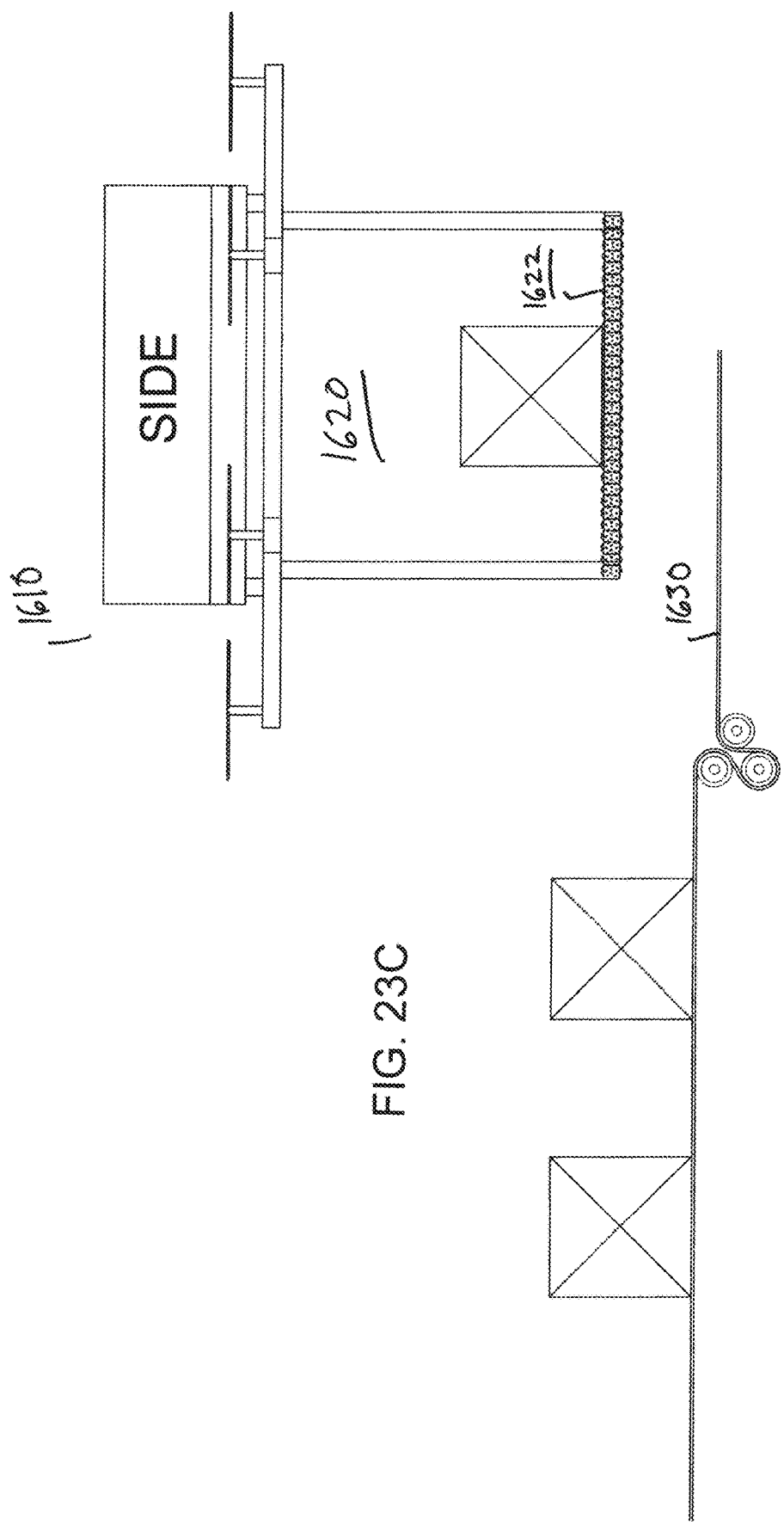

According to another embodiment of the invention, a dynamic support surface of a drone may be externally activated to position an article within an article containment area. For example, as shown in FIG. 22, a drone 1610 may comprise an article containment area 1620 having a bottom 1622 formed by an array of dual-stacked rollers 1623. The dual-stacked rollers 1623 may be housed in modules to form the floor of the article containment area. As shown in FIGS. 23A-23C, the drone 1610 may land on a conveyor belt 1630 or other suitable driver. The conveyor belt 1630 may be the same conveyor belt that brings articles 40 to the drone 1610 for loading, or may be a different conveyor belt 1630. In the embodiment of FIGS. 23A-23C, the drone 1610 docks on the conveyor belt 1630 in a recessed area 1632 so that the infeed area 1631 is flush with the top of the dynamic support surface 1622. As the infeed conveyor belt 1630 moves to bring articles 40 towards the article containment area, the drive portion 1632 in the recessed area contacts the bottoms of the dual-stacked rollers 1623 to cause the upper rollers to rotate, pulling the article 40 into and across the article containment area 1620. Once the article is in proper position within the article containment area 1620, the drone can disengage from the drive conveyor 1630 to deactivate the rollers.

In another embodiment, a conveyor belt, such as the conveyor belt 22 of FIG. 1 or rollers, such as the rollers 123 of FIG. 2, or another component of a dynamic support surface in a drone may be externally driven by a conveyor belt or other external driver to pull an article into position within an article containment area or push an article from an article containment area.

Figure 24:
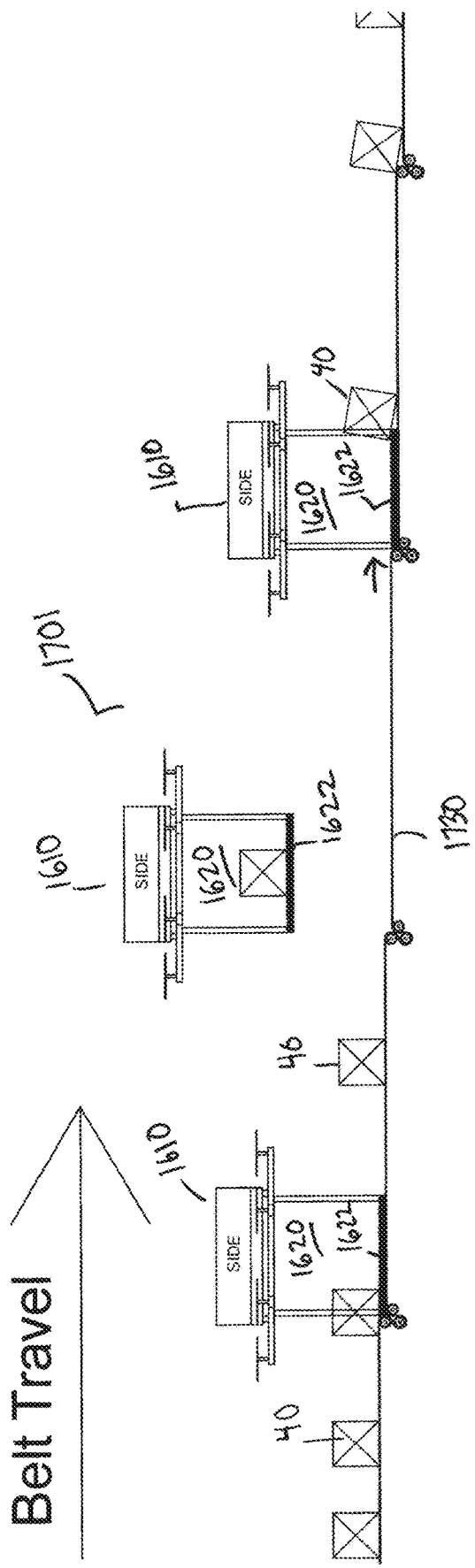
FIG. 24 shows an embodiment of a drone loading system in which a single external conveyor belt waterfalls through one or more transition points to create multiple drone-loading zones.

FIG. 24 shows an embodiment of a drone loading system 1701 in which a single external conveyor belt 1730 waterfalls through one or more transition points to create multiple drone-loading zones. For example, drones 1610 having externally-actuatable dynamic support surfaces 1622, an example of which is shown in FIG. 22, may land in a selected landing/pickup zone created by hitching the conveyor 1730 to step the conveyor down 1730 so that the dynamic support surface can both receive articles and be driven by the conveyor 1730. An article 40 can pass across and through activated surfaces of drones until it reaches an assigned drone 1610. Articles passing through a drone will continue on the conveyor 1730 until being picked up by a drone 1610. Alternatively an article can be assigned to a first available drone in the line.

Figure 25:
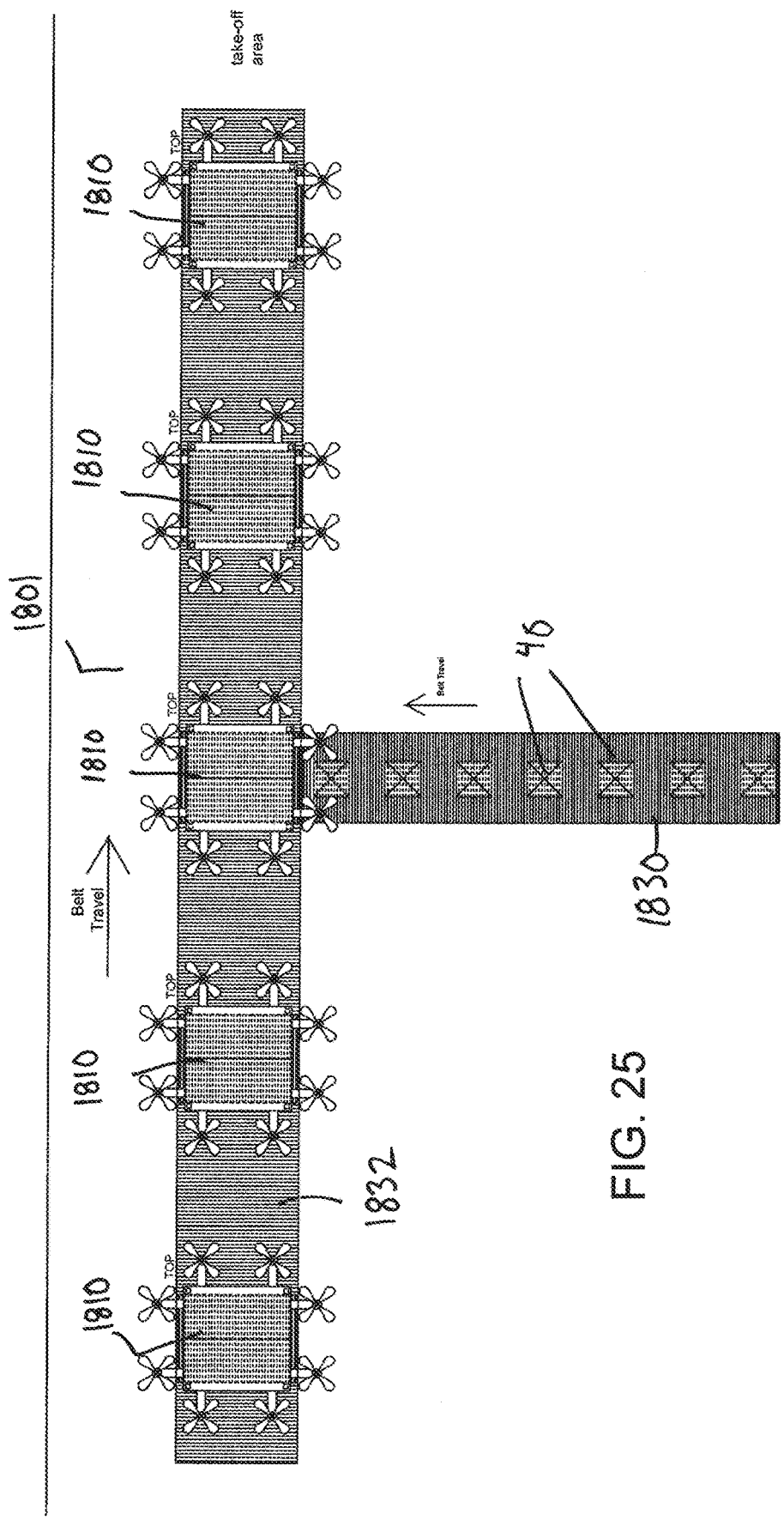
FIG. 25 shows another embodiment of a drone loading system comprising an article feeding conveyor and a drone conveyor.

FIG. 25 shows another embodiment of a drone loading system 1801 comprising an article feeding conveyor 1830 and a drone conveyor 1832. Drones 1810 land on the drone conveyor 1832 and are conveyed past the outfeed of the article feeding conveyor 1830. Articles are loaded onto a dynamic support surface of the drones 1810 through any suitable methods, such as those described above. Then, the drones 1810 depart, carrying their payload.

Figure 26:
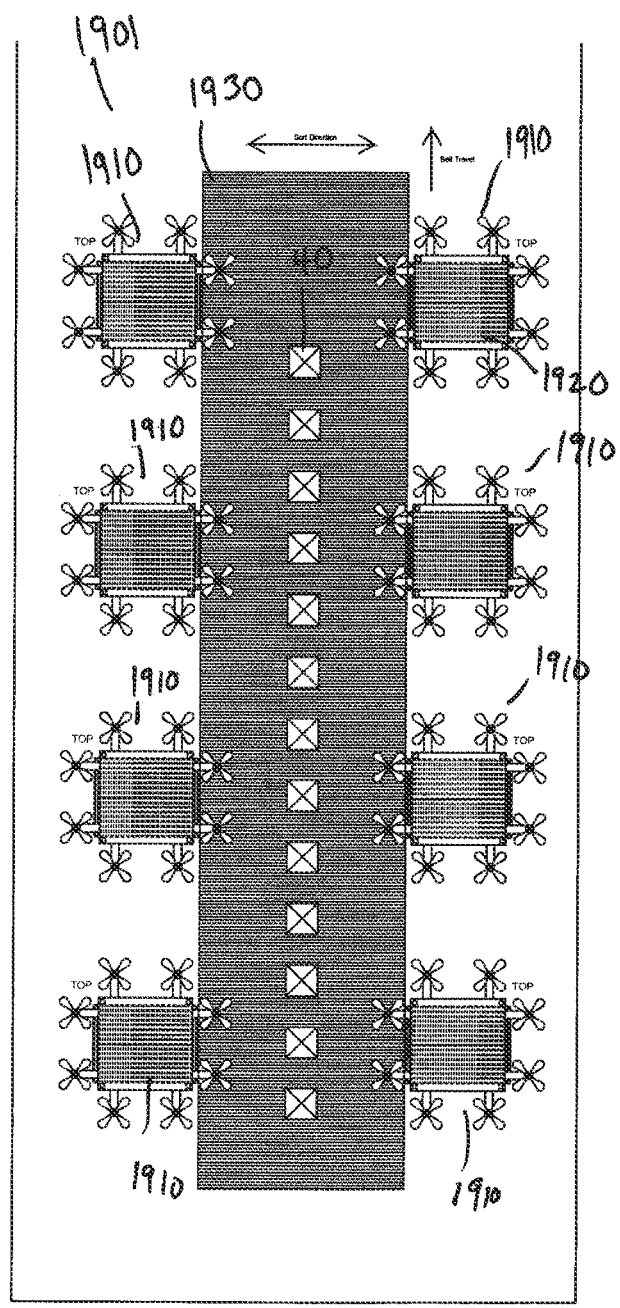
FIG. 26 shows another embodiment of a drone loading system, including a sorting conveyor that moves past drone stations.

FIG. 26 shows another embodiment of a drone loading system 1901, including a sorting conveyor 1930 that moves past drone stations. The sorting conveyor 1930 sorts each article 40 towards a selected drone 1910. The drone 1910 receives the selected article in an article containment area 1920 and takes-off. Drones can move into empty loading stations when signaled.

Figure 27:
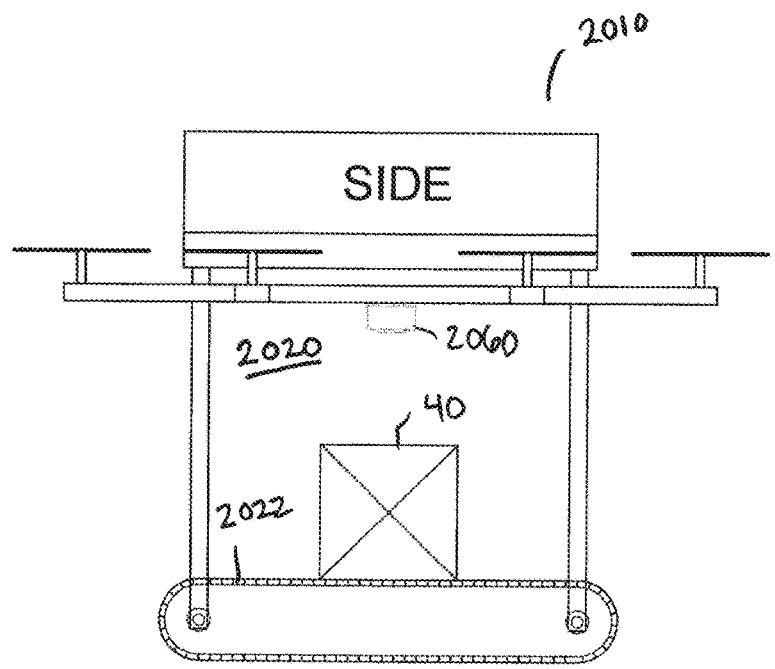
FIG. 27 is a side view of a drone including a dynamic support surface and a top read camera according to another embodiment of the invention.

According to still another embodiment of the invention, shown in FIG. 27, a drone 2010 including a dynamic support surface, shown as conveyor belt 2022, may include a top read camera 2060 in an article containment area 2020. The dynamic support surface moves an article within the article containment area 2020, for example, back and forth, until a successful scan. The drone may include any suitable electronics to promote its function. For example, in another embodiment, a drone with a dynamic support surface can include an anti-theft system that can transmit radio signals to help locate the drone in the event of theft or loss. In another embodiment, QR codes can be printed, etches or molded into the dynamic support surface or the frame of the drone to convey information about the drone. In still another application, the drone can interface with a print and apply machine to print a label on a package supported on a dynamic support surface of the drone.

Figure 28:
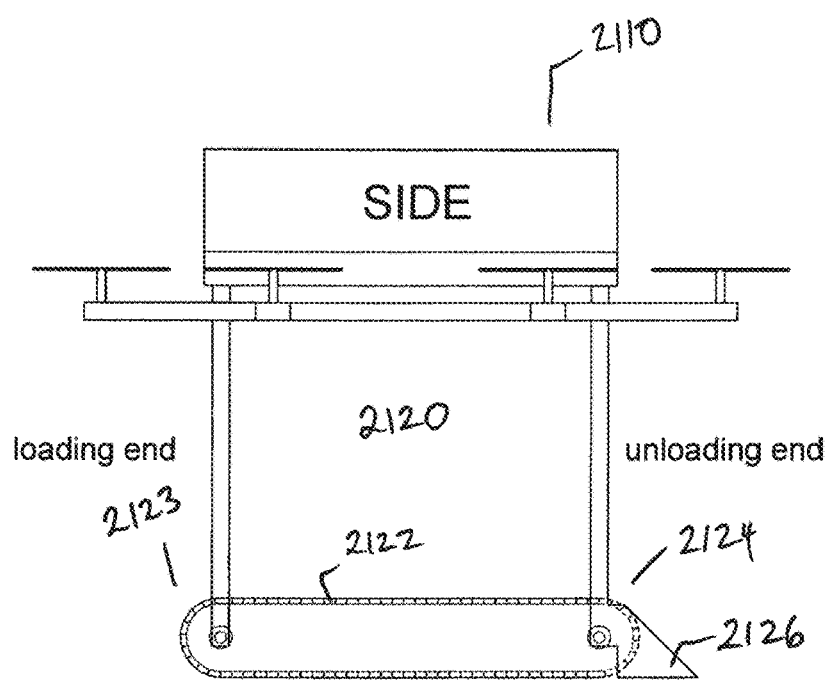
FIG. 28 shows an embodiment of a drone having a dynamic support surface and a ramp to facilitate discharge of an article from the drone.

FIG. 28 shows another embodiment of a drone 2110 including a dynamic support surface, shown as conveyor belt 2122 in an article containment area 2120. A first end 2123 of the conveyor belt forms the loading end of the article containment area 2120 and a second end 2124 forms the discharge end of the article containment area 2120. The discharge end 2124 includes a ramp 2126 to facilitate the smooth transition of products onto a receiving surface. The ramp may comprise a low-friction static surface, or may comprise passive or driven rollers. As described above, the ramp 2126 may selectively pivot between a ramped position and a containing position forming a wall of the article containment area 2120.

In one embodiment, the drone moves in an opposite direction from a direction of travel of the dynamic support surface to promote discharge of an article from an article containment area.

The dynamic support surface of a drone may be selectively locked to prevent unwanted movement of the article.

Figure 29:
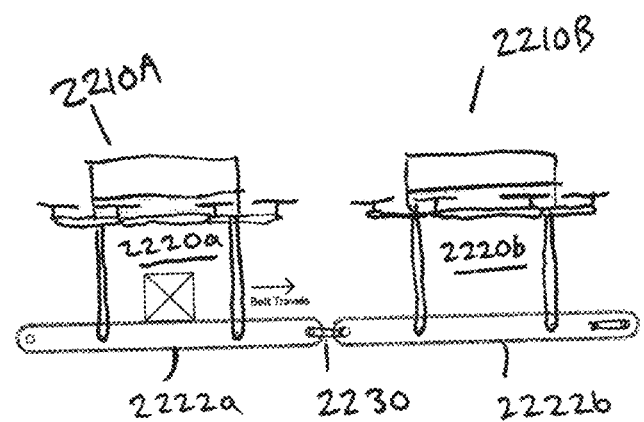
FIG. 29 shows an embodiment of paired drones having dynamic support surfaces extending outside of an article containment area to allow load-sharing.

FIG. 29 shows another application of a drone with a dynamic support surface. In the embodiment of FIG. 29, two drones 2210a and 2210b can share payloads and transfer packages in midair. The drones coordinate positions and align to allow a first drone to discharge a package to the second conveyor belt. The drones 2210*a*, 2210*b* have extended conveyor belts 2222*a*, 2222*b* forming the dynamic support surfaces that extend beyond the article containment areas 2220*a*, 2220*b*. A connector 2230 can link the two drones to facilitate the transfer. Alternatively, two drones can share the load of a large package.

Figure 30A:
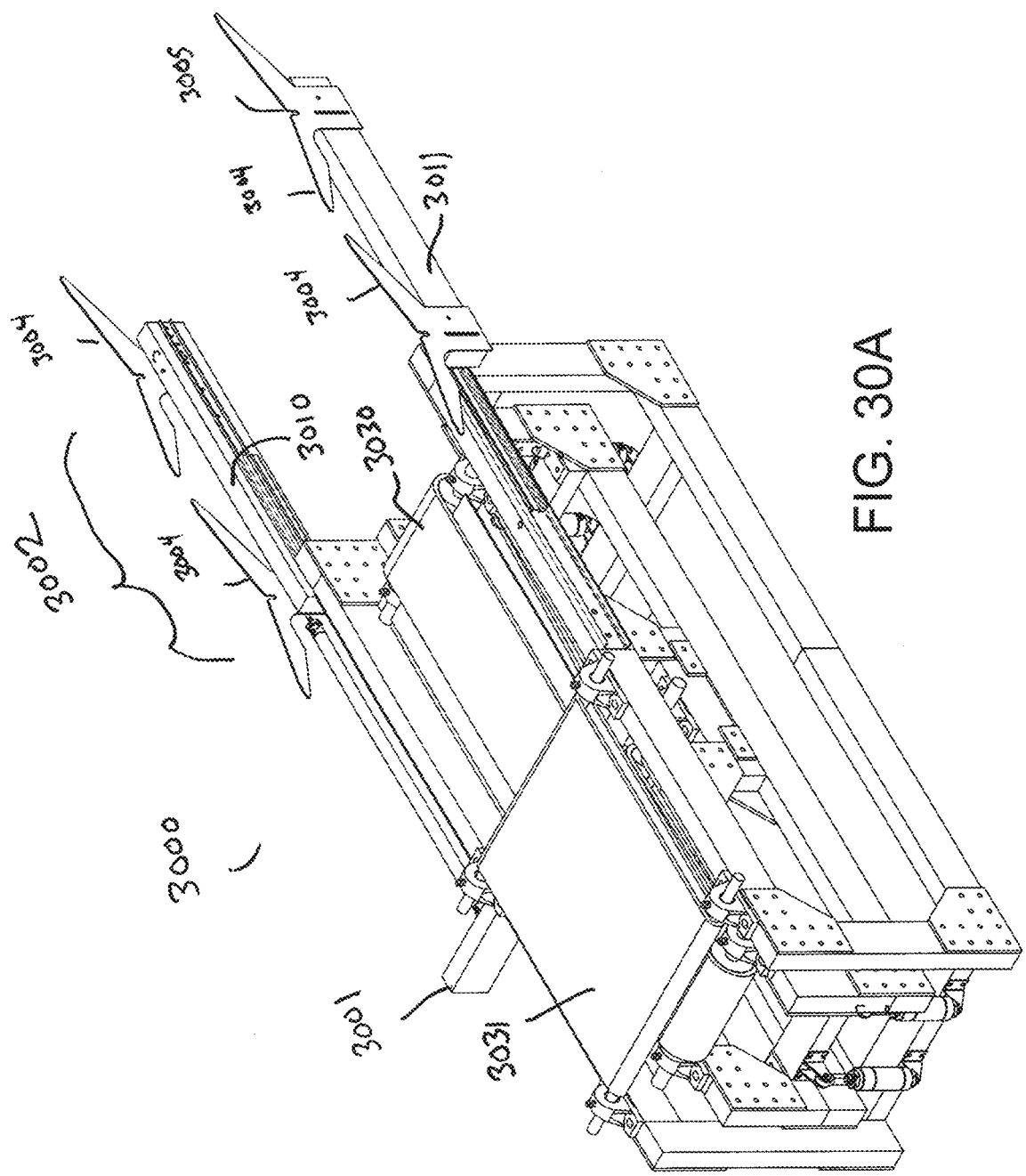
FIG. 30A is an isometric view of an embodiment of a drone docking station.
Figure 30B:
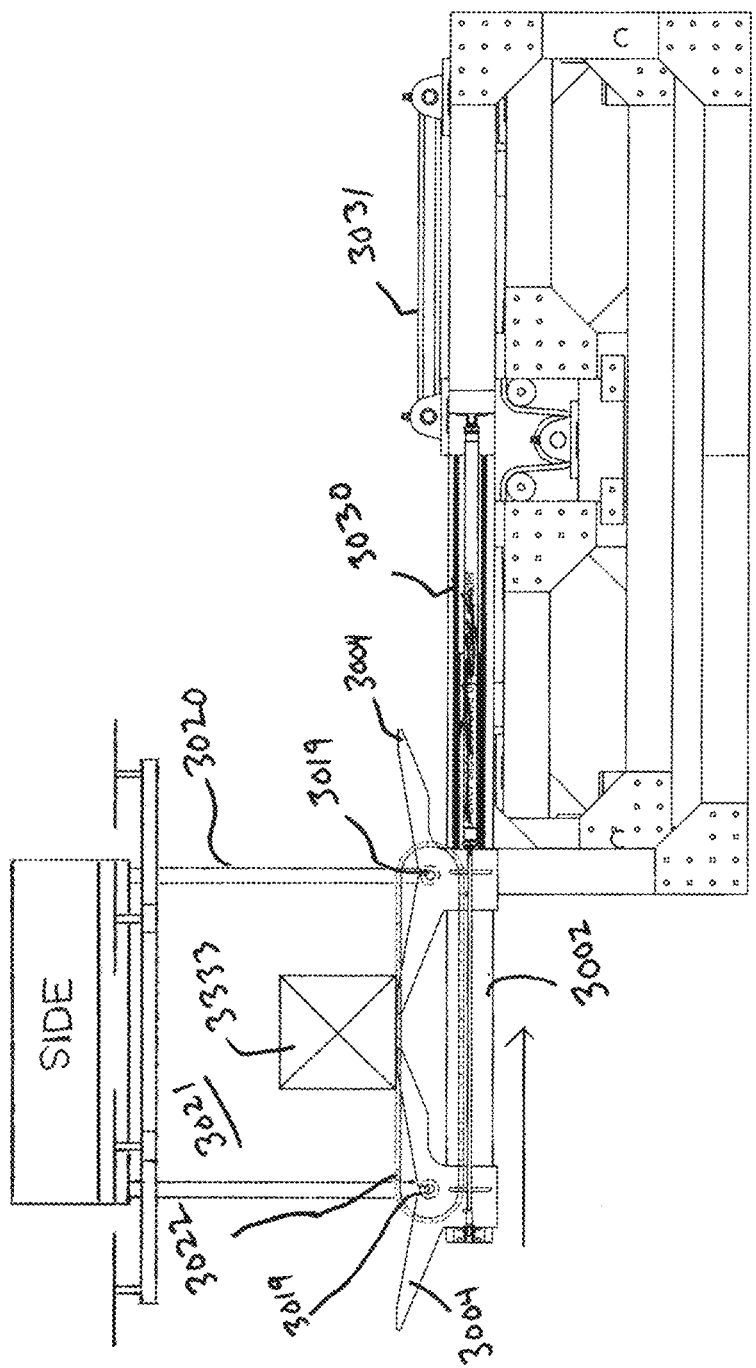
FIG. 30B is a side view of the drone docking station of FIG. 30A.
Figure 30C:
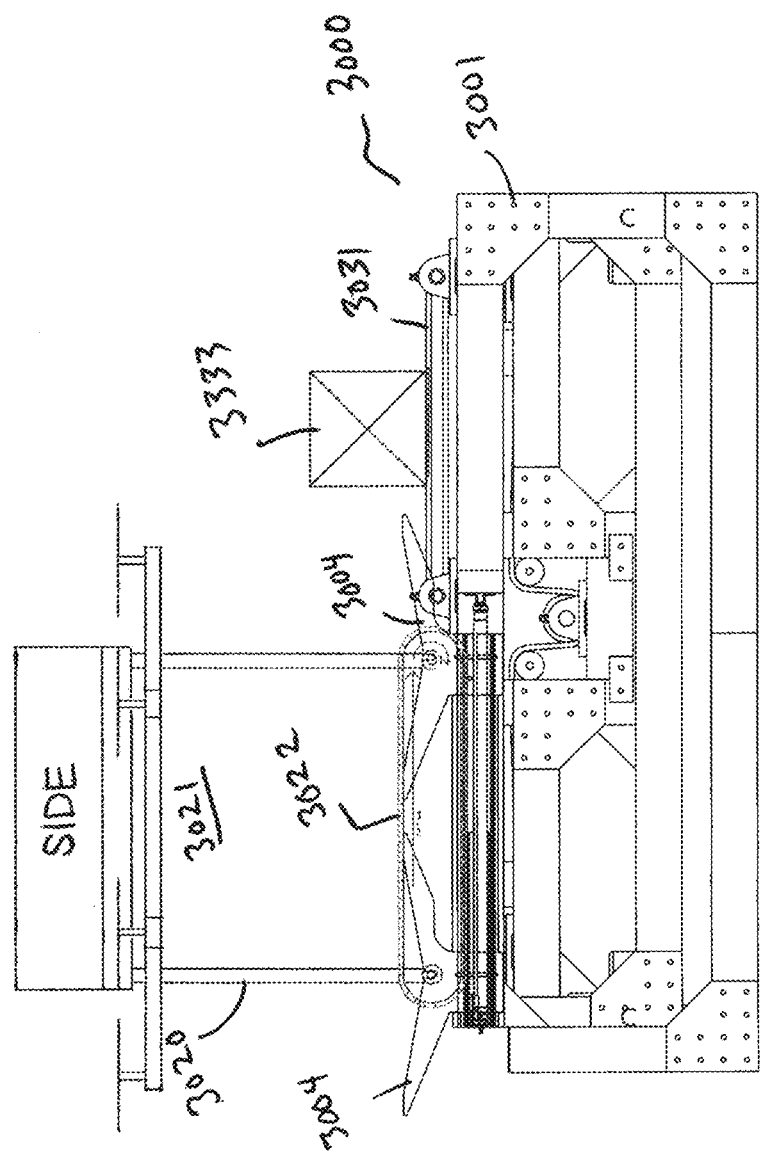
FIG. 30C is a side view of the drone docking station of FIG. 30B with the drawer retracted to allow offloading of an article carried by the drone.

A drone having a dynamic support surface may interface with any suitable type of docking station and warehouse. For example, FIGS. 30A-30C shows an example of a drone docking station 3000 suitable for use with a drone having a dynamic support surface, such as a conveyor belt. The drone docking station 3000 includes a frame 3001 having an extendable drawer 3002 including landing guides 3004 extending from extendable side bars 3010, 3011 for receiving a drone. The illustrative landing guides 3004 comprise substantially y-shaped sheets having top legs that guide a drone axle to a central slot 3005 at the bottom of a channel formed by the top legs. When a drone axle 3019 contacts the top of the guide legs, it slides along the top edge of the guide and falls into the slot 305 to secure the drone 3020 in place, as shown in FIG. 30B. A pneumatic system or other suitable driver can cause the drawer to extend and retract relative to the frame. The docking station 3000 further includes a lower conveyor belt 3030 for driving the conveyor belt 3022 on the drone and a transfer conveyor belt 3031 for receiving articles from the drone or passing articles to the drone.

When a drone 3010 approaches the station 3000, the station pushes the drawer 3002 out, as shown in FIGS. 30A and 30B. The drone 3020 then lands on the extended drawer 3002 with the assistance of the landing guides 3004. After landing the drone, station then retracts the drawer. The lower conveyor belt 3030 contacts the bottom of the conveyor belt 3022 of the drone to move the drone conveyor belt 3022, pushing an article 3333 from the drone's article containment area 3021 onto the transfer conveyor belt 3031. The lower conveyor belt 3030 drives the conveyor belt 3022 on the drone by frication contact. Other means for driving the drone conveyor belt forming the dynamic support surface may be used, such as using gears, rollers, a motor and other means known in the art.

Any suitable means for receiving articles from and discharging articles to a drone may be used. For example, a drone may deliver articles to a mailbox or dedicated receptacle configured to receive a package discharged from a dynamic support surface. The drone may also deliver packages to a vehicle having a landing platform or chute for receiving articles from a drone.

A receiver for a drone may include connectors for securing the drone during delivery. For example, the receiver may include magnets for attracting the drone. In one embodiment, a drone can have permanent magnets mounted at a selected location and the dock or other receiving station has electromagnets. During landing, the electromagnets will have an attractive configuration with the permanent magnets. During takeoff, the electromagnets will have a repulsive configuration with the permanent magnets. While the drone is docked, the electromagnets can have no magnetic field. In another embodiment, a drone may include openings that receive alignment pins in a docking station to selectively lock a drone to a docking station.

The receiver may include a guide, such as an IR transmitter, for guiding the drone to a particular area for discharge.

Although the invention has been described in detail with reference to a few exemplary versions, other versions are possible. So, as these few examples suggest, the scope of the claims is not meant to be limited to the versions described in detail.

What is claimed is:

1. A drone, comprising: a frame; at least one propeller for generating aerodynamic lift; a controller for controlling the propeller; an article containment area for containing an article to be carried by the drone, wherein the article containment area has a bottom formed by an array of externally-actuatable, dual-stacked rollers for supporting the article and allowing the article to move in, out or through the article containment area.

2. The drone of claim 1, wherein the dual-stacked rollers are housed in modules.

3. A drone-loading system, comprising: a drone having a frame, at least one propeller for generating aerodynamic lift, a controller for controlling the propeller, and an article containment area for containing an article to be carried by the drone, wherein the article containment area has a bottom formed by an array of rollers for supporting the article and allowing the article to move in, out or through the article containment area; and a drive conveyor for conveying an article towards the array of rollers for loading into the article containment area, the drive conveyor forming a recessed area for landing the drone, wherein the drive conveyor externally drives the array of rollers to move articles into, out of or through the article containment area.

4. The drone-loading system of claim 3, wherein the array of rollers comprises an array of dual-stacked rollers.

5. The drone-loading system of claim 4, wherein the dual-stacked rollers are housed in modules.

6. The drone-loading system of claim 3, wherein the drive conveyor forms multiple recessed areas forming landing zones for multiple drones.

7. A drone-loading system, comprising:
a conveyor belt for conveying articles, wherein the conveyor belt waterfalls through one or more transition points to create multiple drone-loading zones; and
a drone configured to land in a selected drone-loading zone on the conveyor belt and receive an item from the conveyor belt, wherein the drone comprises a frame, at least one propeller for generating aerodynamic lift, a controller for controlling the propeller and an article containment area for containing an article to be carried by the drone, wherein the article containment area has a bottom formed by an externally-actuatable dynamic support surface for supporting the article, and wherein the conveyor belt selectively drives the externally-actuatable dynamic support surface to push articles into, out of or through the article containment area.

8. The drone-loading system of claim 7, wherein the externally-actuatable dynamic support surface comprises an array of rollers.

9. The drone-loading system of claim 8, wherein the array of rollers comprises an array of dual-stacked rollers.

10. The drone-loading system of claim 9, wherein the dual-stacked rollers are housed in modules.

* * * * *